US012340635B2

(12) United States Patent
Ropel et al.

(10) Patent No.: US 12,340,635 B2
(45) Date of Patent: Jun. 24, 2025

(54) TRACKING VEHICLE BATTERY CONDITION HISTORY USING BLOCKCHAIN TECHNOLOGY

(71) Applicant: Volvo Car Corporation, Gothenburg (SE)

(72) Inventors: Andreas Martin Viktor Ropel, Gothenburg (SE); Ben Peter Lloyd, Gothenburg (SE); Matthias Yannick Philippe Le Saux, Gothenburg (SE); Konstantinos Chatziioannou, Gothenburg (SE); Klas Roland Persson Signell, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 208 days.

(21) Appl. No.: 18/147,825

(22) Filed: Dec. 29, 2022

(65) Prior Publication Data

US 2024/0221436 A1 Jul. 4, 2024

(51) Int. Cl.
*G07C 5/00* (2006.01)
*B60L 58/10* (2019.01)

(52) U.S. Cl.
CPC ............ *G07C 5/008* (2013.01); *B60L 58/10* (2019.02)

(58) Field of Classification Search
CPC ................................ G07C 5/008; B60L 58/10
See application file for complete search history.

(56) References Cited

U.S. PATENT DOCUMENTS

| 9,963,106 | B1 | 5/2018 | Ricci |
| 10,726,642 | B1 | 7/2020 | Goluguri et al. |
| 11,383,616 | B2 | 7/2022 | Ueno et al. |
| 2013/0015982 | A1 | 1/2013 | Matsumoto et al. |
| 2015/0032301 | A1 | 1/2015 | Lamba |
| 2017/0129361 | A1 | 5/2017 | Scaringe |
| 2020/0097786 | A1 | 3/2020 | Skaaksrud |
| 2020/0110453 | A1 | 4/2020 | Wells |

(Continued)

FOREIGN PATENT DOCUMENTS

| CN | 115298716 A | 11/2022 |
| EP | 3 369 603 B1 | 3/2022 |

OTHER PUBLICATIONS

Non-Final Office Action received for U.S. Appl. No. 18/147,843, dated Apr. 11, 2024, 58 pages.

(Continued)

*Primary Examiner* — Andrew J Cromer
(74) *Attorney, Agent, or Firm* — Amin, Turocy & Watson, LLP

(57) ABSTRACT

Techniques are described for tracking information regarding the condition history of a vehicle battery using blockchain technology. In an example embodiment, a system comprises a memory that stores computer executable components, and a processor that executes the computer executable components stored in the memory. The computer executable components comprise a communication component that receives battery information regarding a condition of a vehicle battery over a period of time prior to installation of the vehicle battery in a vehicle, and a recording component that records the vehicle battery information in a blockchain stored on a blockchain network as the vehicle battery information is received over the period of time.

20 Claims, 20 Drawing Sheets

(56) References Cited

U.S. PATENT DOCUMENTS

| | | | |
|---|---|---|---|
| 2020/0396146 | A1 | 12/2020 | Brugman |
| 2020/0406859 | A1 | 12/2020 | Hassani |
| 2021/0042841 | A1 | 2/2021 | Floyd et al. |
| 2021/0065167 | A1 | 3/2021 | Rafferty et al. |
| 2021/0166327 | A1 | 6/2021 | Leise et al. |
| 2021/0264539 | A1 | 8/2021 | Leise et al. |
| 2021/0339649 | A1* | 11/2021 | Ueno ................ H02J 7/007194 |
| 2022/0012675 | A1 | 1/2022 | Nozawa et al. |
| 2022/0207495 | A1* | 6/2022 | Derouen ................ G06Q 10/02 |
| 2022/0224139 | A1 | 7/2022 | Bernatchez et al. |
| 2022/0351306 | A1 | 11/2022 | Zemenchik et al. |
| 2022/0357406 | A1* | 11/2022 | Lu ....................... H01M 10/425 |
| 2024/0020755 | A1 | 1/2024 | Thomason |

OTHER PUBLICATIONS

Partial European Search Report received for European Patent Application Serial No. 23215961.6 dated May 27, 2024, 14 pages.
Non-Final Office Action received for U.S. Appl. No. 18/147,830, dated Sep. 5, 2024, 46 pages.
Final Office Action received for U.S. Appl. No. 18/147,843, dated Aug. 19, 2024, 31 pages.
Non-Final Office Action received for U.S. Appl. No. 18/147,847, dated Oct. 28, 2024, 38 pages.
Non-Final Office Action received for U.S. Appl. No. 18/147,853, dated Oct. 1, 2024, 58 pages.
Communication Pursuant to Rule 69 EPC received for EP Patent Application Serial No. 23215961.6 dated Dec. 16, 2024, 2 pages.
Extended European Search Report received for European Patent Application Serial No. 23215961.6 dated Nov. 11, 2024, 14 pages.
Non-Final Office Action received for U.S. Appl. No. 18/147,850, dated Dec. 18, 2024, 37 pages.
Non-Final Office Action received for U.S. Appl. No. 18/147,843, dated Jan. 23, 2025, 37 pages.
Junior et al., "Blockchain Review for Battery Supply Chain Monitoring and Battery Trading", Renewable and Sustainable Energy Reviews, vol. 157, No. 112078, 2022, 28 pages.
Notice of Allowance received for U.S. Appl. No. 18/147,830, dated Jan. 31, 2025, 67 pages.
Notice of Allowance received for U.S. Appl. No. 18/147,830 dated Feb. 12, 2025, 7 pages.
Non-Final Office Action received for U.S. Appl. No. 18/147,837 dated Mar. 20, 2025, 61 pages.
Demir et al., "Blockchain Based Transparent Vehicle Insurance Management", 2019 Sixth International Conference on Software Defined Systems (SOS), 2019, pp. 213-220.
Final Office Action received for U.S. Appl. No. 18/147,847 dated Feb. 26, 2025, 49 pages.
Final Office Action received for U.S. Appl. No. 18/147,853 dated Apr. 17, 2025, 42 pages.
Grover, Jyoti, "Security of Vehicular Ad Hoc Networks using Blockchain: A Comprehensive Review", Vehicular Communications, vol. 34, 100458, 2021, 19 pages.

* cited by examiner

TRACKING VEHICLE BATTERY CONDITION HISTORY USING BLOCKCHAIN TECHNOLOGY

TECHNICAL FIELD

This application generally relates to battery operated vehicles (e.g., transportation vehicles) and, more particularly, to tracking information regarding the condition history of a vehicle battery using blockchain technology.

BACKGROUND

Electric vehicles are becoming increasingly prevalent worldwide and are poised to become one of the most common modes of transportation. Electric vehicles (EVs) are powered by an electric motor that draws energy from an onboard battery. Chemical energy in the battery is converted to electrical energy, whereby the electrical energy is converted to kinetic energy at the motor. The battery can undergo various changes attributed to the environment and other factors that cause battery to degrade even before it is installed in the cars. It would be useful to know the condition of the battery before installation.

The above-described background relating to vehicle batteries and systems is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses and/or computer program products are presented that facilitate tracking information regarding the condition history of a vehicle battery using blockchain technology.

According to an embodiment, a system comprises a memory that stores computer executable components, and a processor that executes the computer executable components stored in the memory. The computer executable components comprise a communication component that receives battery information regarding a condition of a vehicle battery over a period of time prior to installation of the vehicle battery in a vehicle, and a recording component that records the vehicle battery information in a blockchain stored on a blockchain network as the vehicle battery information is received over the period of time.

In various implementations, the battery information comprises sensor data captured via one or more sensors associated with the vehicle battery, and wherein the reception component receives the sensor data in response to capture of the sensor data by the one or more sensors. For example, the one or more sensors can comprise a sensor integrated on or within the vehicle battery selected from the group consisting of: an environmental sensor, a motion sensor and a pressure sensor. In another example, the one or more sensors comprise a sensor located on or within a transport vehicle used to transport the vehicle battery over the period of time or a storage environment used to store the vehicle battery over the period of time, the sensor selected from the group consisting of an environmental sensor, a motion sensor and a pressure sensor.

In some implementations, the sensor data comprises environment data regarding environmental conditions exposed to the vehicle battery over the period of time, timing of exposure and location of exposure. In this regard, the condition of the vehicle battery can reflect a quality of the vehicle battery, and wherein the computer executable components further comprise an assessment component that determines one or measures of the quality of the vehicle battery based on the environment data, and wherein the recording component records the one or more measures of quality of the vehicle battery in the blockchain. For example, the one or more measures of quality can comprise a measure of damage or deterioration to the vehicle battery attributed to the environmental conditions. The assessment component can further determine timing of the damage or degradation to the vehicle battery and wherein the recording component records the timing of the damage or degradation to the vehicle battery in the blockchain.

In some implementations, the period of time comprises a duration of time between completion of manufacture of the vehicle battery and transfer of the vehicle battery from a first entity to a second entity in accordance with a transaction agreement for the vehicle battery between the first entity and the second entity. For example, the period of time can comprise a transport period time over which the vehicle battery is transported from a first location associated with the first entity to a second location associated with the second entity. In some embodiments, the transaction agreement is defined by a smart contract recorded on the blockchain network, and wherein the computer executable components further comprise a task execution component that controls execution of a first task defined by the transaction agreement based on the battery information or the one or more measures of the quality of the vehicle battery satisfying one or more terms of the smart contract. The task execution component can further control execution of a second task defined by the transaction agreement based on the battery information or the one or more measures of the quality of the vehicle battery failing to satisfy one or more terms of the smart contract.

In some embodiments, elements described in connection with the disclosed systems and devices can be embodied in different forms such as a computer-implemented method, a computer program product, or another form.

DETAILED DESCRIPTION

Figure 1:
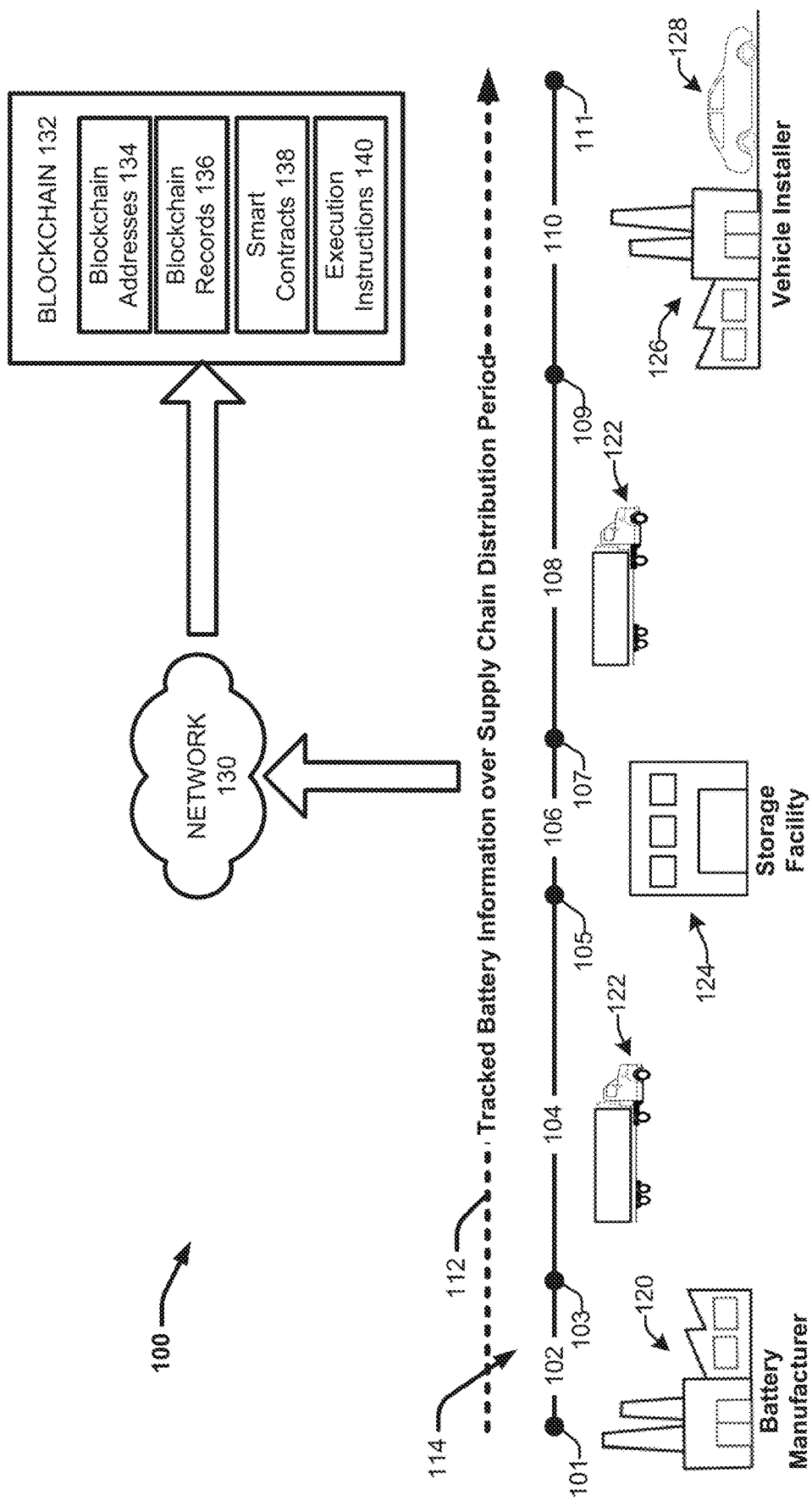
FIG. 1 illustrates a high-level diagram of an example supply chain environment in which information regarding the condition history of a vehicle battery can be tracked using blockchain technology in accordance with various aspects and embodiments described herein.

The following detailed description is merely illustrative and is not intended to limit embodiments and/or application or uses of embodiments. Furthermore, there is no intention to be bound by any expressed or implied information presented in the preceding Background section, or in this Detailed Description section.

The disclosed subject matter is directed to systems, computer-implemented methods, apparatus, and/or computer program products that facilitate tracking information regarding the condition history of a vehicle battery using blockchain technology.

Blockchain technology is widely regarded as a revolutionary, peer-to-peer, decentralized option for data organization; it allows for formation of decentralized monetary systems such as crypto-coins, smart contracts, and other resources that can be managed online such as smart property. Blockchain can be used in distributed ledger systems and allows different entities to exchange data and transactions quickly without intervention or verification by third parties. This can be accomplished through a shared data framework that utilizes computer algorithms to create real-time self-updates. Blockchain technology can also settle financial transactions without mediation from banks and other trusted institutions.

A common framework for blockchain is a decentralized database in which transactions are recorded using a virtually unmodifiable cryptographic signature. Records can be added to the decentralized database to create block that are protected against manipulation and alteration. Each block is connected to a previous block and has a timestamp of one or more transactions (e.g., the time at and/or about which such one or more transactions occurred), metadata characterizing the one or more transactions (e.g., amounts of cryptocurrencies involved in such one or more transactions, blockchain addresses from which and/or to which such amounts of cryptocurrencies were transferred during such one or more transactions), and/or a cryptographic hash of the previous electronic block. Because each electronic block can include a cryptographic hash of the previous electronic block, the blockchain can be resistant to retroactive tampering.

With this framework in mind, one or more embodiments described herein employ blockchain technology to track and record information regarding the condition history of a vehicle battery prior to installation into a vehicle. The condition history can reflect the period of time between completion of manufacture of the battery and arrival of the battery at the installation facility or another relevant timeframe before installation of the battery into the vehicle. The information tracked can include any information that relates to the physical and operational condition of battery which can be impacted (e.g., degraded) by environmental conditions exposed to the vehicle battery and other factors associated with the supply chain distribution process used to transfer the battery from the manufacturer to the final endpoint, the vehicle.

In this regard, the information tracked can include environmental conditions exposed to the battery (e.g., temperature, humidity, chemical exposure, etc.), contextual information associated with the exposure (e.g., timing, duration, location, entity responsible, etc.) and damage or deterioration of the battery attributed to the environmental conditions exposed to the battered (e.g., determined based on analysis of the environmental data). The information tracked can also include mechanical forces impacted on the battery (e.g., due to movement, dropping, improper stacking/positioning, etc.), associated contextual information (e.g., regarding timing, duration, location, entity responsible, etc.), and damage or deterioration attributed to the mechanical forces. The information tracked can also include charging information regarding respective charging and discharging operations of the battery before installation, associated contextual information (e.g., regarding timing of charging, location of charging, state-of-charge pre and post charging, charging device used, etc.) and assessment of an any operational degradation of the battery attributed to the charging/discharging operations. The information tracked can also include contextual information regarding the supply chain distribution process of the battery, such as information tracking the respective locations of the battery over the shipping process, the timing of the battery at the respective locations, and the parties involved (e.g., battery manufacture source, shipping/distribution entities, handlers, storage facility entities, etc.). In some embodiments, the disclosed techniques can also be extended to track battery condition information over the lifetime of the battery after installation into a vehicle as well.

In various embodiments, the information tracked can be collected from one or more sensors associated with the battery (e.g., environmental sensors, pressure sensors, motion sensors, etc.). For example, the vehicle battery can comprise a smart battery that incorporates sensor technology to collect and/or determine sounding information, such as exposure to temperature, time of exposure, and impact of the exposure on operational health of the battery. In some implementations, one or more sensors can be integrated on or within the battery and configured to remain with the battery once installed into the vehicle. In other implementations, a battery monitoring device comprising the one or more sensors can be coupled to the battery and removed prior to installation. For example, a removable battery monitoring device can be physically attached to the battery and adapted to monitor and track information regarding environmental conditions exposed to the battery, mechanical forces sustained, and the associated impact on the operational health of the battery over the course of the supply chain distribution. The removable battery monitoring device can further be detached from the battery upon installation into a vehicle. In other implementations, a battery monitoring device comprising the one or more sensors can be coupled to a charging unit to which one or more batteries are attached. Additionally, or alternatively, one or more battery monitoring devices can be detached from the battery yet located within an environment of the battery (e.g., within the transport vehicle, within the storage unit, etc.). For example, over the course of the distribution process, a vehicle battery may me moved through several different environments and distribution phases, wherein the battery may be held in different storage areas associated with different locations, connected to different charging units, and transported in different transport vehicles. In some implementations, each of the different locations and/or environments where the battery is located over the course of the distribution process can include one or more battery monitoring devices located external to the battery and adapted to monitor and report environmental conditions exposed to the battery at the respective locations.

The battery itself and/or the battery monitoring devices can further include suitable communication technology operable to communicate the sensor data to the blockchain network. For example, in some implementations, the collected information can be stored in local memory associated with the battery and retrieved via wireless and/or physical communication technology to communicate the collected information to the blockchain network. In some implementations, the collected information can be regularly or continuously transmitted to the blockchain network by the battery itself (e.g., using onboard wireless communication technology) and/or via another communication device communicatively coupled to the battery (e.g., via wired or wireless communication technology). For example, in some implementations, the one or more batteries can be communicatively connected (e.g., via wired and/or wireless communication technology) to a communication device of the transport vehicle used to transport the battery and the communication device of the transport vehicle can be adapted to report information for respective batteries to the blockchain network.

In accordance with the disclosed techniques, the information tracked for respective batteries over the course of the distribution process or another timeframe between completion of manufacture and installation into vehicles, is automatically reported and recorded on the blockchain by devices corresponding to Internet of things (IOT) devices. In this regard, the smart battery incorporating sensor and communication technology and the battery monitoring devices described above can respectively correspond to IoT devices. Because these devices collect and report the battery data directly to the blockchain, the information provided by these sources can be considered verified and accurate, as it is not manually intercepted and changed. In various embodiments, all devices that serve as sources of tracked battery condition information can be pre-authorized to write to the blockchain, wherein only authorized and verified devices can write to the blockchain, thus ensuring the recorded condition history information for each tracked battery is accurate and verified. The blockchain network can further control and regulate what devices can write to the blockchain for a particular battery or group of batteries in different implementation contexts.

With the disclosed techniques, as batteries are tracked by the system over time, the blockchain network builds an immutable condition history for each battery that includes information regarding respective locations of the battery over time, environmental conditions exposed to the battery as a function of time, mechanical forces imparted on the battery over time, and other relevant contextual information associated with the transport and delivery process. In some embodiments, condition history for each battery can also include battery state-of-health (SOH) information that provides one or more measures of the operational health of the battery determined based on analysis of the collected sensor data (e.g., using one or more defined algorithms or models). For example, the SOH data can provide a measure of the level of deterioration or damage of the battery, the timing associated with the damage/deterioration, and the entity responsible for the battery at the time of damage/deterioration (e.g., the manufacturer, the shipping company, the storage company, etc.). In this regard, the blockchain recorded condition history of a battery can provide an accurate record of the operational health of a battery before installation into a vehicle and include information regarding any damage or deterioration sustained by the battery over the distribution process, the cause of the damage or deterioration and the entity responsible for the damage/deterioration.

In some embodiments, the blockchain record condition history data for respective batteries tracked using the disclosed techniques can be provided to relevant authorized entities. The relevant authorized entities can include entities involved in the supply chain distribution processes, which may include a plurality of different companies and/or individuals (e.g., associated with the battery manufacture, the shipping/transport company, and the installation company, and/or the vehicle manufacture). The blockchain recorded history of a vehicle battery can also be provided to the end-user, such as the battery purchaser, the purchaser of the vehicle in which the battery is installed or the like.

The blockchain recorded condition history of a vehicle battery can also be used to control and/or initiate various actions and/or responses in an automated manner. For example, in some embodiments, the blockchain network can be configured to notify one or more entities based on the condition history data for a vehicle battery satisfying a notification criterion, such as the SOH of the battery falling below an acceptable level, or the temperature exposed to the battery at a particular storage facility being too high. The collected information can also be texted or emailed to relevant stake holders. For example, a stake holder such as the battery shipper/transporter can sign up to receive periodical updates or an alert if the current environment of a battery may cause damage to the battery. This is useful because it would allow the transporter to be alerted and take corrective action.

In other embodiments, smart contracts can be encoded on the blockchain that control transactions related to the battery between two or more parties, such as transaction for purchase of the battery between the manufacturer and the end-purchaser (e.g., the vehicle manufacture for example). Smart contracts are contracts recorded on the blockchain that self-execute based on satisfaction of the terms and conditions of the contract, wherein a determination of whether the terms and conditions are satisfied is made by the blockchain network based on the corresponding information being recorded (or not) on the blockchain. The smart contract can control automated transfer of payment between parties based on satisfaction (or not) of the terms, as well as other definable tasks, such as providing reimbursement for damaged products, scheduling returns for damage products, verifying a product warranty, and the like. In one example, a smart contract can define terms and conditions regarding an acceptable SOH of the vehicle battery upon final delivery to the end-purchaser. In accordance with this example, at any time during the transfer of the battery from the manufacturer to the end-purchaser, if the SOH of the battery falls below the acceptable level, the smart contract can self-execute to initiate indemnification terms of the smart contract (e.g., such as automatically providing a partial refund, initiating re-ordering of a replacement battery, or the like). Likewise, based on arrival of the battery at the end-purchases with the acceptable SOH, the smart contract can self-execute to initiate transfer of a final payment for the battery from the end-purchaser to the manufacturer in accordance with the terms of the contract.

It is to be understood that when an element is referred to as being "coupled" to another element, it can describe one or more different types of coupling including, but not limited to, electrical coupling, chemical coupling, communicative coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting. As used herein, "data" can comprise metadata.

To aid readability and to prevent repetition, the terms "component", "device", "system", "equipment", "element", and the like, are used interchangeably throughout, and as such, where mention is made of a component, it is to be appreciated that any of the terms "device", "system", "equipment", etc. can equally be utilized. Further, the terms "group", "collection", "set", "subset", "variety", "multitude", "multiple", "plethora", "plurality", "compilation", "assemblage", "assembly", "series", and the like, can all be used interchangeably herein.

It is to be appreciated that while the various embodiments and concepts are presented as directed to lithium-ion battery technologies, the various embodiments and concepts can be equally applied to any battery technology, as further described below. In addition, while one or more devices and/or systems are described below with reference to vehicle batteries designed to operate with an EV, such as an automobile, the one or more embodiments described herein are not limited to this use. For example, one or more embodiments presented herein can be utilized to track condition history data of any battery, wherein the battery may adapted for integration into any type of vehicle, such as a military vehicle, a railroad vehicle, a marine vehicle such as a boat, ship, submarine, or marine drone, a winged vehicle such as a plane or drone, and/or a rotor-ed vehicle such as a helicopter or drone. Likewise, one or more embodiments presented herein can be extended to tracking the condition history of battery to be located on a robot and/or any suitable moving or stationary device. Other applicable applications include scooters, Segway®, electric bicycles, E-rickshaws, and the like.

Further, the embodiments can be applied to any vehicle utilizing a battery charging system, e.g., a Battery Electric Vehicle (BEV) where the powerplant is only an electric motor powered by a battery and the battery is recharged via an external charging station, a Hybrid Electric Vehicle (HEV) having both a gasoline/petrol engine & fuel tank and an electric motor powered by a battery, wherein operation of the HEV recharges the battery (e.g., via a regenerative braking system capturing kinetic energy), a Plug-in Hybrid Electric Vehicle (PHEV) having both a gasoline/petrol engine & fuel tank and an electric motor powered by a battery, wherein the battery can be charged via an external charging station, and the like.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a high-level diagram of an example supply chain environment 100 in which information regarding the condition history of a vehicle battery can be tracked using blockchain technology in accordance with various aspects and embodiments described herein. The supply chain environment 100 includes a battery manufacturer 120 corresponding to a physical manufacturing location where vehicle batteries are manufactured, a vehicle installer 126 corresponding to a physical location where the vehicle batteries are installed in vehicles (e.g., vehicle 128), a transport vehicle 122 used to transport the vehicle batteries between the battery manufacture 120 and the vehicle installer 126, and a storage facility 124 where the vehicle batteries are stored for a duration of time in association with the transfer of the batteries from the battery manufacturer 120 to the vehicle installer 126. It should be appreciated that the supply chain environment illustrated in FIG. 1 is merely exemplary and intended to illustrate some example elements of an example supply chain used to distribute vehicle batteries from a battery manufacturer to another entity in association with a purchase agreement for the batteries by the other entity (or another type of agreement), which in this case refers to the vehicle installer 126. The specific entities involved in the supply chain can vary, including the number and type of transport vehicles used, the number and type of storage facilities used, the agreements between the different parties involved and the like. In this regard, it should be appreciated that before a battery is installed into a vehicle 128 upon completion of manufacture, the battery can be moved to various different locations associated with different entities (e.g., the manufacturer, the shipping company, the storage facility company, the vehicle installer, etc.) and subjected to different environments and conditions which can impact the final operating health and quality of the battery.

Regardless of the specific entities involved with the transfer of a battery from its manufacturing source to a vehicle 128, the disclosed subject matter provides techniques to capture and/or determine information (i.e., tracked battery information 112) about the condition and context of the battery over the supply chain distribution period (or any time period before installation in the vehicle 128 for that matter) and record the information in a blockchain 132. In some embodiments, the disclosed techniques can also be extended to continue to track and record information regarding the condition history of a battery after installation into a vehicle 128.

FIG. 1 includes an example timeline 114 corresponding to an example supply chain distribution period over which information regarding the condition and context of vehicle batteries can be tracked and recorded on a blockchain 132. Timeline 114 demonstrates an example timeline of events associated with the transfer of a vehicle battery from the vehicle manufacture to the vehicle installer 126. The timeline 114 is described with respect to a single battery, however it should be appreciated that the sequence of events described can be associated with the transfer of any number of batteries grouped together in the same shipment or the like. The timeline 114 initiates at 101 which corresponds to the time of completion of manufacture of a vehicle battery. At 103, the battery is loaded onto the transport vehicle 122 and departs the manufacturer after a first timeframe 102 over which the battery was maintained at the battery manufacturer 120. At 105, the battery is removed from the transport vehicle 122 and placed in a storage facility 126 after passage of a second timeframe 104 over which the battery was transported from the manufacturer to the storage facility 124 by the transport vehicle 122. At 107, the battery is loaded onto the transport vehicle 122 (which may include a different transport vehicle associated with a different transport company) and transported to the vehicle installer after passage of third timeframe 106 over which the battery was stored at the storage facility 124. At 109, the battery is removed from the transport vehicle after a fourth timeframe 108 over which the battery was transported from the storage facility to the vehicle installer 126. Timeline 114 ends at 111 at which time the battery is installed into the vehicle 128 after passage of a fifth timeframe 110 over which the battery was held/maintained at the vehicle installer 126.

In accordance with various embodiments, the tracked battery information 112 over the supply chain distribution period can include event timeline information corresponding to the timeline of events (i.e., timeline 114) that occur with respect to the transfer of the battery from the manufacturer 120 up until the installation of the battery into a vehicle 128. For example, the tracked battery information 112 can identify each event that occurred corresponding to events 101, 103, 105, 107, 109 and 111 and the timeframes between the events (e.g., timeframe 102, timeframe 104, timeframe 106, timeframe 108 and timeframe 110) the timing/duration of each event, the entity or entities involved (e.g., the handlers, the transport company, the driver identity, etc.) and the location or locations associated with each event and timeframe. The level of granularity of contextual information associated with the respective events can vary. In some implementations, information regarding the transportation of the battery can identify the route taken, weather conditions along the route, driver speed and stops performed, the identity of the driver and so on.

The tracked battery information 112 can further include information regarding environmental conditions exposed to the battery (e.g., temperature, humidity, chemical exposure, etc.), contextual information associated with the exposure (e.g., timing, duration, location, entity responsible, etc.) and damage or deterioration of the battery attributed to the environmental conditions exposed to the battered (e.g., determined based on analysis of the environmental data). The tracked battery information 112 can also include information regarding movement and orientation of the battery (e.g., wherein orientating the battery incorrectly/up-side down for instance may induce damage), mechanical forces imparted on the battery (e.g., due to movement, dropping, improper stacking/positioning, etc.), associated contextual information (e.g., regarding timing, duration, location, entity responsible, etc.), and damage or deterioration attributed to the mechanical forces. The tracked battery information 112 can also include charging information regarding respective charging and discharging operations of the battery performed over the supply chain distribution period, relevant contextual information associated with the charging operation (e.g., regarding timing of charging, location of charging, state-of-charge pre and post charging, charging device used, etc.) and an assessment of an any operational degradation of the battery attributed to the charging/discharging operations.

As illustrated in FIG. 1, the tracked battery information 112 collected and/or determined for a battery over the distribution period can be recorded on a blockchain 132 to provide an immutable record of the condition history of the battery over time. In its broadest sense, a blockchain refers to a framework that supports a trusted ledger that is stored, maintained, and updated in a distributed manner in a peer-to-peer network. Though maintaining cryptocurrency transactions in the distributed ledger may be the most recognizable use of blockchain technology today, the ledger may be used in a variety of different fields where data of any type may be accessed where the accuracy of the data is assured. To facilitate this end, the blockchain 132 can include execution instructions 140 that define devices authorized to provide information to be recorded on the blockchain 132 as an authorized and verified source of the tracked battery information 112. The execution instructions 140 can further define and control what devices can write to the blockchain (e.g., full nodes as described below), what information is recorded on the blockchain and how (e.g., the hashing and verification protocols used). The exaction instructions 140 can also define entities authorized to access the blockchain for read-only purposes.

The devices authorized to provide information to be recorded on the blockchain 132 can include various devices associated with the battery manufacturer 120, the transport vehicle 122, the storage facility 124, the vehicle installer 126, the vehicle itself 128, and other entities involved with the battery supply and distribution chain, that are configured to capture and/or determine relevant information regarding the condition and context of a battery (e.g., tracked battery information 112) in an automated fashion that ensures the accuracy of the data (e.g., without manual data entry and/or involvement), and report the data to the blockchain 132 via a network 130. In this regard, the network 130 may be any of a variety of available networks, such as the Internet, and represents a worldwide collection of networks and gateways to support communications between devices connected to the network 130 (e.g., the Internet, a cellular network, a wide area network (WAN), a local area network (LAN), a personal area network (PAN) or any other suitable wired and/or wireless communication networks).

In various embodiments, the authorized sources of tracked battery information 112 can include the batteries themselves. In this regard, in some embodiments, the batteries can correspond to smart batteries that incorporate one or more sensors (e.g., environmental sensors, pressure sensors, motion sensors, etc.) that collect and/or determine information regarding environmental conditions exposed to the battery (e.g., temperature, humidity, water exposure, chemical substance exposure, etc. time of exposure, and impact of the exposure on operational health of the battery. The smart battery can further include communication technology that enables the battery to communicate the data to the blockchain 132 via the network 130 to effectuate the recording of the data on the blockchain 132 in accordance with the execution instructions 140. Additionally, or alternatively, the authorized devices can include battery monitoring devices configured to removably attach to one or more batteries and monitor and track information regarding environmental conditions exposed to the battery, mechanical forces sustained, and the associated impact on the operational health of the battery over the course of the supply chain distribution. The authorized devices can also include IoT devices associated with the battery manufacturer 120, the transport vehicle 122, the storage facility 124 and/or the vehicle installer 126, configured to capture and/or determine and report information regarding environmental conditions exposed to batteries and/or track respective locations of batteries throughout the distribution process. Various additional types of authorized devices and corresponding information capable of being tracked and reported by the respective devices are described infra with reference to FIG. 2.

The blockchain 132 can include a set of blockchain address 134 and blockchain records 136. The blockchain records 136 can correspond to the information recorded on the blockchain 132 for respective batteries tracked using the disclosed techniques and the execution instructions 140. For example, as applied to cryptocurrency applications, such as Bitcoin, the blockchain records 136 may correspond to cryptocurrency transactions that have been digitally recorded. As applied to various embodiments of the disclosed subject matter, the blockchain records 136 can correspond to tracked battery information 112 for respective batteries. In various instances, the blockchain records 136 can be linked to corresponding blockchain addresses of respective batteries for which the respective records pertain. For example, a blockchain record recording the condition history of a battery can be linked to a corresponding blockchain address associated with the battery. For example, each battery tracked by the system can be assigned a unique blockchain address of the set of blockchain addresses 134 that is tied to a unique identifier for the battery (e.g., a unique battery identifier (ID) such as a unique identification number or the like). In association with recording tracked information for a particular battery, an authorized source of the information can identify the battery to which the information pertains (e.g., by the unique battery identifier) and/or the blockchain address associated with the battery. Information received for a particular battery from different authorized sources/devices can be linked to the same battery and/or the same blockchain address for the battery. The recorded data entry for the battery condition history can further be linked to its blockchain address. In this regard, the blockchain 132 can be considered as a digital record of the set of blockchain records 136 for a set of blockchain addresses 134 corresponding to different batteries. In some embodiments, some or all of the tracked battery information 112 for respective batteries can be stored in a data store (not shown) that is external to the blockchain and the blockchain records 136 can include hashed data entries that immutably link to the corresponding battery information as aggregated and stored externally. The blockchain 132 can further include smart contracts 138 that can control transactions related to the batteries between two or more parties, such as a transaction for purchase of a battery between the manufacturer and the end-purchaser (e.g., the vehicle installer 126 or vehicle manufacture for example). Additional details regarding the smart contracts 138 are described infra with reference to FIG. 9.

The blockchain 132 can include any suitable blockchain capable of recording tracked battery information 112 and executing smart contracts 138 in a verifiable and immutable manner. In various embodiments, the blockchain 132 can be a decentralized digital ledger made up of a sequence of electronic blocks. In various instances, any given electronic block can include a timestamp (e.g., time and/or date) associated with one or more blockchain records 136 corresponding to respective data entries of tracked battery data for a particular battery or group of batteries associated with the same conditions. In various cases, the given electronic block can also include metadata pertaining to the one or more blockchain records 136, such as the source of the data (e.g., the particular device authorized to write to the blockchain 132), the location of the data on external storage (in implementations in which some or all of the actual data is stored externally), a unique battery ID associated with the data, and/or respective blockchain addresses associated with the data. In some cases, the given electronic block can further include metadata pertaining to the one or more blockchain addresses, such as age of a blockchain address (e.g., days, months, and/or years since registration and/or creation of the blockchain address) and/or number of smart contract tokens obtained by a blockchain address. Moreover, in various aspects, the given electronic block can include any suitable cryptographic hash of the preceding electronic block. In various instances, because each electronic block in the blockchain 132 can include a cryptographic hash of the previous electronic block, the blockchain 132 can be resistant to retroactive tampering and/or falsification.

Figure 2:
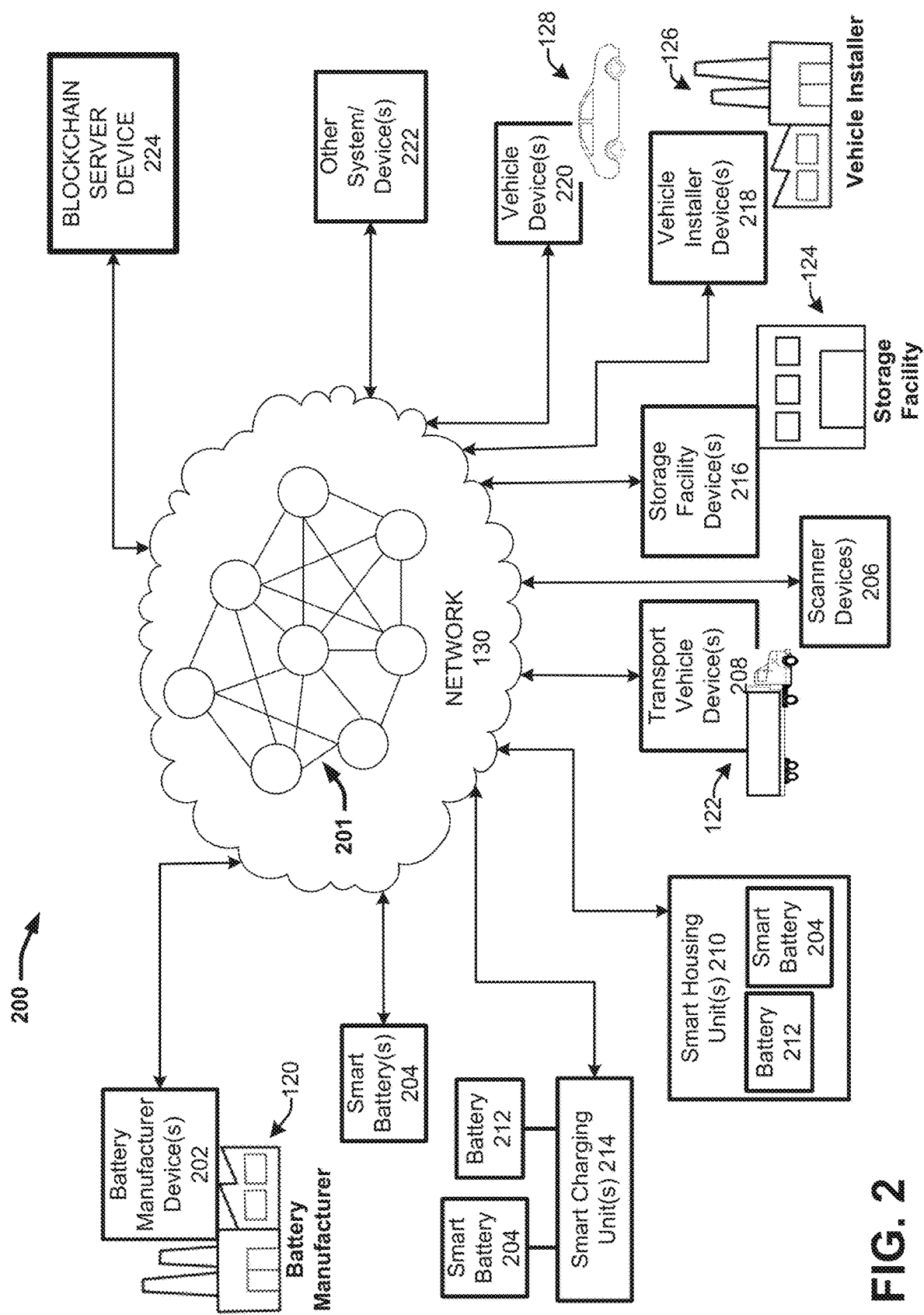
FIG. 2 illustrates an example system that facilitates tracking information regarding the condition history of a vehicle battery using blockchain technology in accordance with various aspects and embodiments described herein.

FIG. 2 illustrates an example system 200 that facilitates tracking information regarding the condition history of a vehicle battery using blockchain technology in accordance with various aspects and embodiments described herein. With reference to FIGS. 1 and 2, system 200 includes a plurality of different devices connected to network 130, wherein the network 130 includes a blockchain network 201 which comprises the blockchain 132. As noted above, the network 130 may be any of a variety of available networks, such as the Internet, and represents a worldwide collection of networks and gateways to support communications between devices connected to the network 130. The different devices can include various devices authorized to access and/or write to the blockchain 132 associated with the blockchain network 201 and provide all or portions of the tracked battery information 112 for respective batteries tracked by the system 200. These devices can include, but are not limited to: one or more battery manufacturer devices 202 associated with the battery manufacturer 120, one or more smart batteries 204, one or more smart charging units, one or more smart housing units 210, one or more transport vehicle devices 208, one or more scanner devices 206, one or more storage system devices 216, one or more vehicle installer devices 218, one or more vehicle devices 220, other systems/devices 222 and blockchain server device 224. These devices can respectively correspond to computing devices and/or IoT devices with suitable communication hardware and/or software that enables the respective devices to connect to the network 130 using any suitable wired or wireless communication technology.

In this regard, as noted above, in some embodiments the authorized sources of tracked battery information 112 can include the batteries themselves in embodiments in which the batteries correspond to smart batteries 204. For example, the smart batteries 204 can incorporate one or more sensors (e.g., environmental sensors, pressure sensors, motion sensors, etc.) that collect and/or determine information regarding environmental conditions exposed to the battery (e.g., temperature, humidity, water exposure, chemical substance exposure, etc.), time of exposure, and impact of the exposure on operational health of the battery. The smart battery can further include communication technology that enables the battery to communicate the data to the blockchain network 201 via the network 130 to effectuate the recording of the data on the blockchain 132 in accordance with the execution instructions 140. With these embodiments, the sensing and reporting operations of the smart batteries 204 can be activated at the battery manufacturer 120 in association with completion of manufacture thereof. The smart batteries can thereafter continue to track condition information over the course of the distribution period (or another timeframe) and communicate the information to the blockchain network 201 over the distribution period when connected to the network 130 (e.g., in association with transfer of the battery from one location to the next, one entity to the next, and so on, in accordance with timeline 114 or the like). In some implementations, the smart batteries 204 can be enabled to write to the blockchain 132 directly. In other implementations, the smart batteries 204 can communicate the data to one or more blockchain server devices (e.g., blockchain server device 224 or the like) which in turn write the data to the blockchain 132 upon successful validation (e.g., in accordance with the validation requirements defined in the blockchain execution instructions). Additional information regarding the features and functionalities of the smart batteries 204 are described infra with reference to FIG. 4.

Additionally, or alternatively, the authorized sources of tracked battery information 112 can include smart housing units 210. The smart housing units 210 can correspond to a physical housing or structure on which or within which a plurality of batteries 212 are placed in association with the distribution processes. The batteries 212 can include conventional EV batteries (e.g., battery 212) and/or smart batteries 204). For example, the smart housing units 210 can correspond to shipping units, shipping containers or the like that hold or contain a plurality of batteries to be transported from the manufacturer 120 to the vehicle installer 126. In this regard, the smart housing units 210 can be moved from location to location and/or entity to entity in accordance with the supply chain distribution process. The smart housing units 210 can incorporate technology that enables the smart housing units to collect and/or determine relevant portions of the tracked battery information 112 and communicate the data to the blockchain network 130. For example, in some implementations, the smart housing units 210 can incorporate one or more battery monitoring devices comprising one or more sensors that collect information regarding environmental conditions exposed to the batteries coupled thereto. The one or more battery monitoring devices can further include communication technology that enables the battery monitoring device to communicate the data to the blockchain network 201 via the network 130 to effectuate the recording of the data on the blockchain 132 in accordance with the execution instructions 140. In some implementations, the one or more battery monitoring devices associated with the smart housing units 210 can be enabled to write to the blockchain 132 directly. In other implementations, the battery monitoring devices can communicate the data to one or more blockchain server devices (e.g., blockchain server device 224 or the like) which in turn write the data to the blockchain 132 upon successful validation (e.g., in accordance with the validation requirements defined in the blockchain execution instructions). Additional information regarding the features and functionalities of the smart housing units are described infra with reference to FIG. 6.

Still in other embodiments, the authorized sources of tracked battery information 112 can include one or more battery monitoring devices such as those described above with respect to the smart housing units 210, yet otherwise associated with one or more batteries. For example, in some implementations, one or more battery monitoring devices may be located in different environments where the batteries are placed, such as one or more areas at the battery manufacturer 120, within the transport vehicle 122, within the storage facility 124, within the vehicle installer 126 and the like. Additionally, or alternatively, a battery monitoring device may be attached to a conventional battery (e.g., battery 212) to effectively turn the battery into a "smart battery" for the duration of the supply chain distribution period and removed upon installation of the battery into the vehicle 128. Additional information regarding the features and functionalities of the battery monitoring devices are described infra with reference to FIG. 5 (e.g., and battery monitoring device 504).

Additionally, or alternatively, the authorized sources of tracked battery information 112 can include smart charging units 214. The smart charging units 214 can correspond to conventional charging units that perform charging operations to charge one or more EV more batteries yet with additional technology that enables the smart charging units 214 to collect and/or determine and provide relevant portions of the tracked battery information 112 to the blockchain network 130. For example, in some implementations, the smart charging units 214 can incorporate one or more battery monitoring devices comprising one or more sensors that collect information regarding environmental conditions exposed to the batteries coupled thereto (e.g., which can include one or more smart batteries 204 and conventional vehicle batteries 212), and other information related to the SOH and/or the state-of-charge (SOC) of the respective batteries. The smart charging units 214 can further include communication technology that enables the charging unit to communicate the data to the blockchain network 201 via the network 130 to effectuate the recording of the data on the blockchain 132 in accordance with the execution instructions 140. The smart charging units 214 can include fixed location units and mobile units. The smart charging units 214 may be distributed at various locations along the supply chain distribution route and/or associated with various entities involved in the supply chain distribution. For example, one or more smart charging units 214 may be located at the battery manufacturer 120, the transport vehicle 124, the storage facility 124, the vehicle installer 126 and/or at other locations and/or associated with other entities. In some implementations, the smart charging units 214 can be enabled to write to the blockchain 132 directly. In other implementations, the smart charging units 214 can communicate the data to one or more blockchain server devices (e.g., blockchain server device 224 or the like) which in turn write the data to the blockchain 132 upon successful validation (e.g., in accordance with the validation requirements defined in the blockchain execution instructions). Additional information regarding the features and functionalities of the smart charging units 214 are described infra with reference to FIG. 7.

The authorized sources of tracked battery information 112 can also include one or more scanner devices 206. The scanner devices 206 can correspond to devices with suitable capture technology operable to capture information identifying batteries tracked by the system 200. For example, the scanner devices 206 can correspond to radio frequency identifier (RFID) tag reader devices that scan and read RFID tags attached to the respective batteries and/or groups of batteries (e.g., associated with package, a smart housing unit 210 or the like). Additionally, or alternatively, the scanner devices 206 can correspond to QR code readers, barcode readers or the like adapted to read corresponding quick response (QR) codes, barcodes, etc. associated with respective batteries. The RFID tags (and/or the QR codes, the barcodes etc.) associated with the batteries can provide the unique battery ID associated with each battery. In this regard, the scanner devices 206 can provide for tracking the location and movement of respective batteries tracked by the system 200 throughout the supply chain distribution process based on the corresponding locations of the scanner devices (e.g., RFID tag readers or the like). For example, the scanner devices 206 can include fixed and/or mobile (e.g., handheld or the like) devices located at the battery manufacturer 120, the transport vehicle 122, the storage facility 124, the vehicle installer 126, and the like. The scanner devices 206 can respectively be configured to capture and report information identifying respective batteries located at the corresponding location of the scanner device and the timing of detection (e.g., battery unique ID, scanner device location and scanning time timestamp). In various embodiments, each time a battery is moved from one location to another or from one entity to another in association with the supply chain distribution process, the battery can be scanned by a corresponding scanner device (e.g., automatically in association with passage over, manually via a handheld scanner device, or the like) associated with the respective locations and/or entities to indicate arrival and/or departure of the battery and thus facilitate tracking respective events (e.g., of the supply chain distribution process. In some implementations, the scanner devices 206 can be enabled to write to the blockchain 132 directly. In other implementations, the scanner devices 206 can communicate the data to one or more blockchain server devices (e.g., blockchain server device 224 or the like) which in turn write the data to the blockchain 132 upon successful validation (e.g., in accordance with the validation requirements defined in the blockchain execution instructions).

In various embodiments, the battery manufacture devices 202 can include various devices associated with the battery manufacturer 120 that are authorized to provide some or portion of the tracked battery information 112 for respective batteries tracked by the system to the blockchain network 201. These devices can include battery monitoring devices, scanner devices 206, smart charging units 214 and other devices. The transport vehicle devices 208, the storage facility devices 216, the vehicle installer devices 218 and the vehicle devices 220 can similarly include one or more battery monitoring devices, scanner devices 206, smart charging units 214 and other devices that are that are authorized to provide some or portion of the tracked battery information 112 for respective batteries tracked by the system to the blockchain network. The other systems/device 222 can correspond to any computing device that can connect to the network 130. For example, in some implementations, the other systems/devices 122 can correspond to client devices or user equipment associated with users of the system 200. The other systems/devices 122 can also correspond to server devices associated with weather tracking systems, location tracking systems, financial institutions, battery ordering systems, transport/delivery systems, battery manufacturing systems, and various other systems that may be employable by the blockchain network 201 to facilitate generating blockchain records, verifying blockchain records, and/or executing smart contracts 140. In this regard, the other systems/devices 222 can include any suitable computing device or machine (e.g., a communication device, a desktop computer, a personal computer, a smartphone, a server, a virtual computing device, etc.), or interconnected group of computing devices/machine (e.g., interconnected via wired and/or wireless communication technologies) with connectivity to the network 130.

Figure 3:
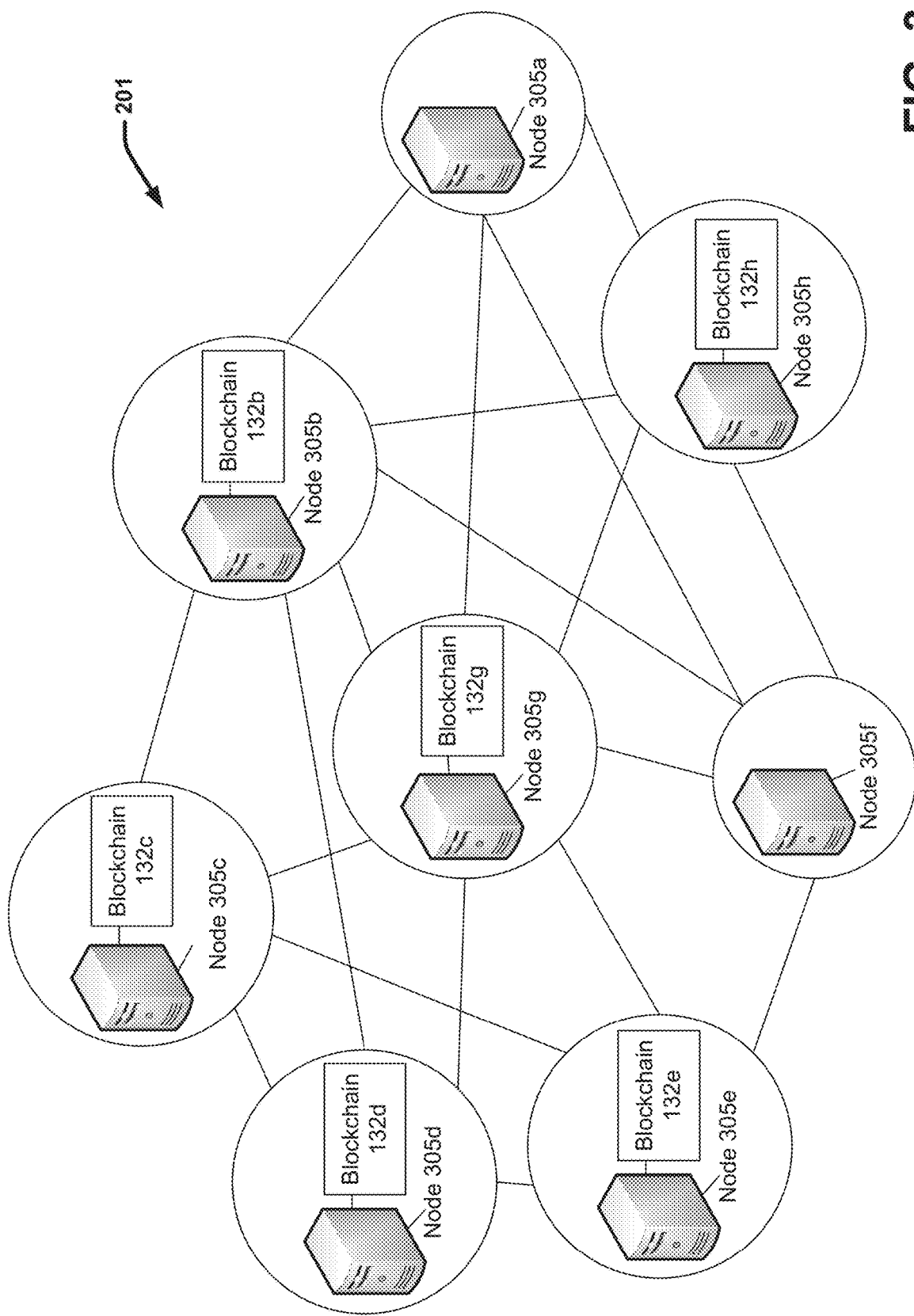
FIG. 3 illustrates an example blockchain network in accordance with various aspects and embodiments described herein.

FIG. 3 illustrates an example blockchain network 201 in accordance with various aspects and embodiments described herein. With reference to FIGS. 1-3, as discussed above, the blockchain 132 can correspond to a distributed ledger that maintains timestamped records of the condition history of batteries. The blockchain 132 can be stored, maintained, and updated in a peer-to-peer network, referred to as blockchain network 201. The blockchain network 201 can comprise a plurality of interconnected devices, referred to as blockchain nodes 305a-h. Each of the nodes 305a-h may comprise a computing device. In some implementations, one or more of the nodes 305a-h may comprise a pool of computing devices. The blockchain 132 may be stored at least at multiple nodes (or devices) of the blockchain network 201. Some or all of the nodes 305a-h may replicate and save an identical copy of the blockchain 132 respectively indicated with a corresponding subletter (e.g., blockchain 132b, blockchain 132c, blockchain 132d, blockchain 132c, blockchain 132g, and blockchain 132h). For example, FIG. 3 shows that the nodes 305b-e and 305g-h store copies of the blockchain 132. The nodes 3055b-e and 305g-h may independently update their respective copies of the blockchain 132.

Blockchain nodes, for example, the nodes 305a-h, may be full nodes or lightweight nodes. Full nodes, such as the nodes 305b-e and 305g-h, may act as a server in the blockchain network 201 by storing a copy of the entire blockchain 132 and ensuring that battery records posted to the blockchain 132 are valid. The full nodes 305b-e and 305g-h may publish new blocks on the blockchain 132 corresponding to new battery data entries of the blockchain records 136. Lightweight nodes, such as the nodes 305a and 305f, may have fewer computing resources than full nodes. For example, IoT devices often act as lightweight nodes. The lightweight nodes may communicate with other nodes 305, provide the full nodes 305b-e and 305g-h with information, and query the status of a block of the blockchain 132 stored by the full nodes 305b-c and 305g-h. In this example, however, as shown in FIG. 3, the lightweight nodes 305a and 305f may not store a copy of the blockchain 132 and thus, may not publish new blocks on the blockchain 132.

In some embodiments, one or more of the devices connected to the network 130 illustrated in system 200 (e.g., the battery manufacturer devices 202, the smart batteries 204, the smart charging units 214, the smart housing units 210, the transport vehicle devices 208, the scanner device 206, the storage system devices 216, the vehicle installer devices 218, the vehicle devices 120, the other systems/devices and/or the blockchain server devices 224) may correspond to full nodes or lightweight nodes of the blockchain network 201. For example, in some embodiments, various IoT devices connected to the network 130 configured to capture and/or determine information regarding the condition and/or context of batteries (e.g., the smart batteries 204, the smart charging units 214, the smart housing units 210, scanner devices 206 and others) can correspond to lightweight nodes of the blockchain network 201. With these embodiments, the respective devices may not store a copy of the blockchain 132 and thus may not directly publish new blocks on the blockchain 132. However, the respective devices can be configured to communicate the information to full nodes of the blockchain network which in turn publish (e.g., record/write, and store) the information to the blockchain 132 as new blocks of the blockchain records 136 in association with validating or verifying the information. For example, in various embodiments, the blockchain server device 224 can be or correspond to such a full node of the blockchain network 201. The blockchain network 201 can further include a plurality of full nodes corresponding to the blockchain server device 224. The respective full nodes can employ various predefined protocols for validating data entries to be published to the blockchain (e.g., based on the data being received from a verified/authorized device as included in metadata in the reported battery data or the like, and/or based on other criterion) defined in the blockchain execution instructions 140).

The blockchain network 201 and its associated blockchain 132 may be public (permissionless), federated or consortium, or private. If the blockchain network 201 is public, then any entity may read and write to the associated blockchain 132. However, the blockchain network 201 and its associated blockchain 132 may be federated or consortium and controlled by a single entity or group organization. For example, in one or more embodiments, the blockchain network 201 and its associated blockchain 132 can correspond to a consortium blockchain controlled by a group of entities consisting of the various different parties associated with the vehicle battery supply chain (e.g., the battery manufacturer 120, the transport company, the storage facility 124, the vehicle installer 126, etc.). With these embodiments, the execution instructions 140 defining and controlling the rules and protocols regarding what devices are authorized sources of battery data to be recorded on the blockchain, the type of data to be recorded, the verification protocols required, the hashing protocol employed, and so on, can be mutually agreed to and accepted by the consortium. Still in other embodiments, the blockchain network 201 and its associated blockchain 132 may be private (permissioned) if access to the blockchain network 201 and the blockchain 132 is restricted to specific authorized entities, for example organizations or groups of individuals.

Moreover, read permissions for the blockchain 132 may be public or restricted while write permissions may be restricted to a controlling or authorized entity.

Figure 4:
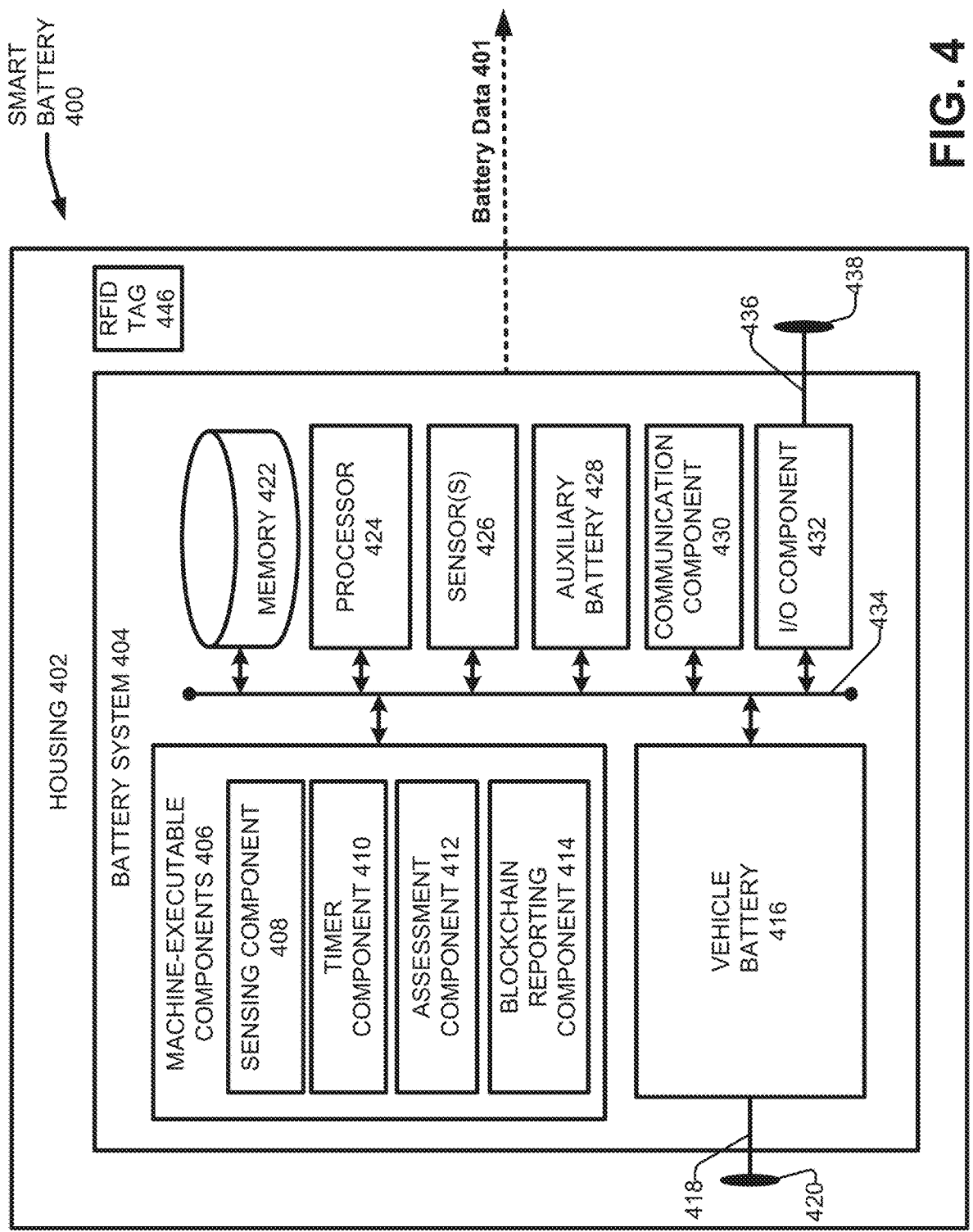
FIG. 4 illustrates an example smart battery in accordance with various aspects and embodiments described herein.

FIG. 4 illustrates an example smart battery 400 in accordance with various aspects and embodiments described herein. In various embodiments, the one or more smart batteries 204 can correspond to smart battery 400, or vice versa. Repetitive description of like elements employed in respective embodiments is omitted for sake of brevity.

With reference to FIGS. 1-4, the smart battery 400 includes a battery system 404 integrated on within a housing 402. The housing 402 can comprise any suitable material or combination of materials designed to protect and contain the battery system 404 and integrate the smart battery 400 within a vehicle (e.g., one or more metal materials, plastic materials and other materials). In some embodiments, the housing can 402 can include an RFID tag 446 that stores a unique device ID for the smart battery 400 capable of being read by one or more scanner devices 206 facilitate tracking the location and identity of the smart battery 400, as described above.

The battery system 404 includes machine-executable components 406, vehicle battery 416, memory 422, processor 424 (e.g., a computer processing unit, a microprocessor, or the like), one or more sensors 426, auxiliary battery 428, communication component 430, and input/output (I/O) component 432. The battery system 404 further include a system bus 434 that couples the machine-executable components 406, the vehicle battery 416, the memory 422, the processor 424, the one or more sensors 426, the communication component 428, the auxiliary battery 430, and the I/O component 432 to one another. In some embodiments, machine-executable components 406 can be stored in memory 422 and executed by the processor 424 to cause battery system 404 to perform operations described with respect to the corresponding components. Examples of said memory 418 and processor 424 as well as other suitable computer or computing-based elements, can be found with reference to FIG. 19 (e.g., processing unit 1904 and system memory 1906 respectively), and can be used in connection with implementing one or more of the devices, systems or components shown and described in connection with FIGS. 1-4, or other figures disclosed herein.

The vehicle battery 416 can correspond to any suitable energy storage system that can be utilized to store and provide electrical energy for electric components of a vehicle, including an EV. In this regard, in some embodiments, the entirety of the smart battery 400 can be adapted for integration into a vehicle (e.g., an EV or the like), wherein an electric motor (and/or other electrical components of the vehicle) are powered by energy supplied by the vehicle battery 416 via one or more wired connections 418. The smart battery housing 400 can include one or more battery ports 420 that facilitate electrically connecting the vehicle battery 416 to a vehicle motor and/or other electrical components of the vehicle once installed. In various embodiments, the vehicle battery 416 can comprise a rechargeable battery. The charging operation typically entails connection of the vehicle battery 416 to a charging station via a charging cable plugged into a charging port connected to the vehicle battery 416. For case of illustration, the one or more battery ports 420 can encompass any electrical cable connection port to the vehicle battery 416 including charging ports, vehicle motor connection ports and the like.

In this regard, the vehicle battery 416 can comprise one or more battery cells comprising including battery cells comprising lithium-ion (Li-ion), lithium nickel cobalt Aluminum (NCA), lithium-nickel manganese cobalt (NMC), lithium-manganese Spinel (LMO), lithium Titanate (LTO), lithium-iron Phosphate (LFP), lithium metal polymer (LMP), nickel manganese cobalt (NMC), nickel-metal hydride (Ni-MH), lithium sulphur (Li—S), lead-acid batteries, as well as ultracapacitors, super capacitors, chemical batteries, solid-state batteries, fuel cells, etc. For example, the vehicle battery 416 can comprise a solid-state battery pack, made up of one or more electrically coupled solid-state battery sections. In further implementations, the vehicle battery 416 an comprise one or more battery cells (e.g., lithium battery cells), thus comprising a single-cell battery or a multi-cell battery. The vehicle battery 416 may comprise a singular unit and/or battery be formed from a collection of smaller battery modules, wherein the battery modules are electrically interconnected to form the larger battery. Furthermore, each of the battery modules can further comprise a collection of cells, e.g., cylindrical, prismatic, pouch, coin, and the like, connected in series or parallel. The various embodiments presented herein are applicable to the various battery types described here along with any battery technology in development.

The sensors 426 can include one or more sensors configured to detect and/or measure sensor data regarding the condition and/or context of the vehicle battery 416. The "condition" of the battery can encompass the quality of the physical condition of the battery 400 and/or vehicle battery 416, the quality of the operating condition of the vehicle battery 416 (or state-of-health (SOH) of the vehicle battery 416). In some implementations, the condition of the vehicle battery can also encompass the state-of-charge (SOC) of the vehicle battery 416 in some implementations. Generally, SOC is an indication of a percentage of charge left in a vehicle battery 416 (or respective modules of the vehicle battery 416). The SOH generally refers to a measure of operating quality of the vehicle battery 416 which can be damaged or deteriorated based on exposure of the vehicle battery 416 to various environmental conditions (e.g., sustained high heat, water damage, chemical damage), physical damage (e.g., attributed to mechanical forces and other factors), damage attributed to improper charging operations, and other factors. The one or more sensors 426 can provide sensor data that can be used to assess the SOH of the vehicle battery 416, the SOC of the vehicle battery 416 and other contextual information pertaining to the history of the vehicle battery 416 prior to installation into a vehicle, such as events that occur (e.g., movement of the battery from location to location, entity to entity, etc., charging events, storage events, holding periods, etc.), timing of the events, entities involved, location of the events, and so one.

In various embodiments, the sensor 426 can include one or more environmental sensors configured to detect and/or measure environmental sensor data regarding environmental conditions exposed to the vehicle battery 416, including but not limited to, a thermometer, moisture sensors, chemical sensors, image sensors of cameras (e.g., digital cameras, heat cameras, infrared cameras, and/or the like), acoustic sensors, lasers, radar systems, lidar systems, and other environmental sensors. The sensors 426 can also include one or more sensors that can detect motion/movement, orientation, location and/or mechanical forces imparted on the vehicle batter 416, such as but not limited to, odometers, altimeters, speedometers, accelerometers, inertial measurement units (IMUs), gyroscopes, pressure sensors, and global positioning system (GPS) sensors. In some embodiments, the sensors 426 can also include one or more sensors that measure information regarding the SOC of the vehicle battery 416, such as but not limited to, voltage, current, impedance, charging profile, and discharging profile. In some embodiments, one or more of the sensors 426 can reside within outside the housing 402, within the housing 402 and/or within the vehicle battery 416 and can communicate with other components in a wired or wireless fashion, depending on integration for respective embodiments.

The communication component 430 can correspond to any suitable communication device comprising communication technology (e.g., hardware and/or software) that can perform wireless and/or wired communication of data between the battery system 404 and other communication systems and communication devices. In this regard, the communication component 430 can provide for communicating information (e.g., battery data 401) between the smart battery 400 and one or more computing devices of the blockchain network 201 (e.g., one or more nodes 305*a-h*) via network 130 using any suitable wired or wireless communication technology (e.g., WiFi, cellular, BLUETOOTH®, near field communication (NFC), etc., and/or combinations thereof). Examples of suitable communication technology hardware and/or software employable by the communication component 430 are described infra with reference to FIG. 19.

The auxiliary battery 428 can correspond to any suitable additional energy storage that can be utilized to store and provide electrical energy for components of the battery system 404 excluding the vehicle battery 416. For example, in some embodiments, the auxiliary battery 428 can provide electrical energy to power the memory, the processor 424, the one or more sensors 426 and the communication component 430 before the smart battery 400 is installed in a vehicle. Additionally, or alternatively, the auxiliary battery 428 may be removed and the vehicle battery 416 can provide the electrical energy for these components prior to installation of the smart battery 400 in a vehicle.

The I/O component 432 can facilitate communication of data, instructions, sensor data, battery data 401 etc., between any of the components of the battery system 404 and external devices via a wired/cable connection. For example, in some embodiments, the battery system 404 can store some or portions of the battery data 401 in memory 422 which can be communicated to another device connected to the battery system via the I/O component 432 and a wired cable connection. In this regard, the housing 402 can include an I/O port 438 that is electrically connected to the I/O component 432 via a suitable cable 436.

The machine-executable components 406 can include sensing component 408, timer component 410, assessment component 412 and blockchain reporting component 414.

The sensing component 408 can utilize one or more sensors 426 to collect the corresponding sensor data therefrom. In various embodiments, the sensing component 408 collects, filters, conditions and prepares subsets of the sensor data for processing by the assessment component 412 to determine or infer relevant events and/or conditions associated with the vehicle battery 416 based on the sensor data, and/or for reporting to the blockchain network 201 by the blockchain reporting component 414 for recording on the blockchain 132. For example, the sensing component 408 can transform analog sensor data to digital information. In some embodiments, all or portions of the sensor data collected and/or processed by the sensing component 408 can be stored in memory 422. Likewise, all or portions of the information determined by the assessment component 412 based on the sensor data may be stored in memory 422. The timer component 410 can correspond to a clock or another suitable timer that tracks time. The timer component 410 can generate timestamps for respective sensor measurements collected by the sensing component 408 from the respective sensors 426 and/or for prepared subsets of the sensor data. For example, in some implementations, the sensing component 408 and the timer component 410 can generate prepared sensor data that plots respective measurements or subset of the respective measurements captured by the sensors 426 as a function of time and date. The assessment component 412 can also generate timestamps for respective events and/or conditions determined by the assessment component 412 based on the sensor data.

The sensing component 408 can also control activation and timing of collection of measurements by the respective sensors 426 over the lifecycle of the vehicle battery 416 or another relevant timeframe, such as the supply chain distribution period, or the like. For example, in some embodiments, the sensing component 408 can activate the one or more sensors 426 and the timer at an initial activation time, which can coincide with completion of manufacture of the smart battery 400. In this regard, the sensing component 408 can activate the one or more sensors in response to manual input or the like at the battery manufacturer 120. Once activated, the sensing component 408 can collect measurements from the respective sensors 426 over any period of time thereafter, such as up until the smart battery 400 is installed into a vehicle 128 or after. The sensing component 408 can collect respective measurements from the sensors 426 continuously, according to a defined schedule (e.g., every ten seconds, once a minute, every five minutes, etc.), and/or in response to defined trigger events or conditions reflected in one or more subsets of the senor measurements or the like.

The sensor data collected by the sensor component 408 can pertain to any measurable parameter capable of being measured by the corresponding sensors. For example, the sensor data can comprise any measurable parameter pertaining to environmental conditions exposed to the vehicle battery 416 detected via one or more environmental sensors 426 (e.g., temperature, moisture, humidity, wind, chemical substances (e.g., any detectable substance cable of being detected by a chemical sensors), sunlight, radiation, etc.). The sensor data can also comprise any measurable parameter pertaining to movement of the vehicle battery 416 and/or mechanical forces imparted on the vehicle battery 416 (e.g., location, speed, direction, orientation, force, pressure, etc.). In some embodiments, the sensor data can also identify or indicate a location of the vehicle battery (e.g., determined using a GPS sensor or the like). The sensor data can also comprise any measurable parameters pertaining to the operating conditions of the vehicle battery 416 (e.g., voltage, current, temperature, impedance, capacitance, and the like).

In some embodiments, the sensing component 408 can additionally detect and measure information regarding SOC and charging operations of the vehicle battery 416. In this regard, the SOH of the vehicle battery can account for the charge capacity, retention and consumption rates of the vehicle battery 416, which may be negatively impacted due to environmental conditions exposed to the battery, improper charging cycles and other factors prior to installation of the vehicle battery 416 in a vehicle. The SOH can be based upon the capacity of the battery unit and/or respective modules, the SOC of the battery unit and/or respective modules, internal resistance, and the like. The SOH of the vehicle battery 416 can also be based upon the number of charge/discharge cycles, operational lifetime, and operational performance of the respective modules and battery. In this regard, the vehicle battery 416 may be charged one or more times over the period of time preceding installation into a vehicle. The sensing component 408 can measure and detect (e.g., via one or more sensors 426) information regarding the number of charge/discharge cycles of the vehicle battery 416, SOC, charge retention, charge fading, charging profile, voltage, current, and the like for the vehicle battery over time prior to installation of the vehicle to facilitate assessing the SOH of the vehicle battery 416.

In some embodiments, using communication component 430, the blockchain reporting component 414 can report all or portions of the sensor data collected, filtered and/or processed by the sensing component 408 to the blockchain network 201 for recording on the blockchain 132. With these embodiments, the battery data 401 can include all or portions of the sensor data with associated timestamps. For example, the blockchain reporting component 430 can employ the communication component 430 to wirelessly transmit the battery data 401 to one or more nodes (e.g., nodes 305*a-h*) of the blockchain network 201 and/or one or more server devices of the blockchain network 201 (e.g., corresponding to blockchain server device 224). The battery data 401 can further include the unique ID for the battery to which the battery data pertains (e.g., smart battery 400 and/or vehicle battery 416) and in some implementations, the blockchain address (e.g., of blockchain addresses 134) for the corresponding battery. Based on reception of the battery data 401, the one or more nodes of the blockchain network 201 can record the battery data on the blockchain 132 in accordance with the execution instructions 140. For example, the one or more nodes can verify the data based on information included in the execution instructions 140 indicating the source of the sensor data, the smart battery corresponding to the received battery ID included in the battery data 401, is a verified source. Various other verification mechanisms are also envisioned. Based on verification of the battery data 401, the one or more nodes can record the received battery data 401 for the smart battery 400 on the blockchain 132 as one or more blockchain records 136 for the smart battery 400. In other embodiments, the smart battery 400 itself can be authorized to write to the blockchain directly. With these embodiments, the blockchain reporting component 414 can write to the blockchain 132 as stored on one or more nodes of the blockchain network 201 and generate corresponding entry records on the blockchain 132 for the battery.

In some embodiments, the blockchain reporting component 414 can report all or portions of the sensor data in response to capture and collection thereof by the sensing component 408. In this regard, the blockchain reporting component 414 can report the sensor data in real-time or substantially real-time. Additionally, or alternatively, the blockchain reporting component 414 can report the subsets of the sensor data according to a defined schedule (e.g., every minute, every five minutes, every ten minutes, every hour, etc.), and/or in response to defined trigger events or conditions. In this regard, it should be appreciated that the reported battery data 401 can correspond to a plurality of sequentially reported subsets of sensor data and/or processed sensor data reported to the blockchain over time, either in real-time, according to a schedule, or in response to defined trigger events/conditions or the like.

As noted above, the sensor data collected by the sensing component 408 can be analyzed to determine information regarding the SOH of the vehicle battery 416, the SOC of the vehicle battery 416 and other contextual information pertaining to the history of the vehicle battery 416 prior to installation into a vehicle, such as events that occur (e.g., movement of the battery from location to location, entity to entity, etc., charging events, storage events, holding periods, etc.), timing of the events, entities involved, location of the events, and so on. The information determined based on analysis of the sensor data can further be recorded as data entries for the corresponding battery (e.g., smart battery 400 and/or vehicle battery 416) on the blockchain 132. In some embodiments, this assessment can be performed by one or more server nodes of the blockchain network 201 based on the reported and received sensor data. Additionally, or alternatively, this assessment can be performed by the assessment component 412. With these embodiments, in addition to and/or alternative to the sensor data, the battery data 401 can include information determined by the assessment component 412 regarding the regarding the SOH of the vehicle battery 416, the SOC of the vehicle battery 416 and other contextual information pertaining to the history of the vehicle battery 416 prior to installation into a vehicle.

In this regard, in one or more embodiments, the assessment component 412 can determine or infer one or more measures of the SOH of the vehicle battery 416 based on the collected sensor data. In some implementations, the one or more measures of the SOH can include one or more measures of the quality of the operating condition of the vehicle battery 416, such as a measure of the level of deterioration of the vehicle battery 416. The one or more measures of the SOH can also include one or more measure of physical damage to the battery (e.g., the vehicle battery 416 and/or the smart battery 400). In association with determining measures of deterioration and/or damage to the battery, the assessment component 412 can also determine relevant contextual information such as the timing of the damage/deterioration, the cause of the damage/deterioration, the location at which the damage/deterioration was sustained, the entity or entities responsible for the battery at the time, and so on. The assessment component 412 can also determine or infer one or more measures of the SOC of the vehicle battery 416. The assessment component 412 can also determine or infer other contextual information pertaining to the history of the vehicle battery 416 prior to installation into a vehicle, including events that occur over the course of the supply chain distribution period, such as events corresponding to the timeline 114 of events exemplified in FIG. 1 or the like. For example, based on the sensor data, the assessment component 412 can determine events corresponding to movement of the battery from one location to another location (e.g., based in part on motion data and/or tracked location data using a GPS sensor), charging events, storage/holding periods, timing of the events (e.g., start/end times and duration), entities involved, and so on.

The assessment component 414 can employ various mathematical models to determine one or more measures of the SOH of the vehicle battery 416 based on the sensor data. These models can correlate various factors represented in the sensor data measurements to a level of deterioration of the vehicle battery and/or other measures of quality and/or damage to the vehicle battery 416. For example, the models can be employed to determine a level of damage or deterioration to the vehicle battery 416 based on environmental conditions exposed to the vehicle battery 416, timing of exposure, and duration of exposure. The models can also factor in mechanical forces impacted on the battery, timing of impact, duration of impact and degree of impact (e.g., amount of pressure/force). The models can also factor in movement of the battery (e.g., attributed to dropping, banging, stacking, etc.), and positions of the battery. The models can also factor in parameters related to charging operations, including number of charging/discharging cycles, frequency of charging/discharging cycles charging voltage and current profiles, discharging voltage and current profiles, and changes in charge states of the vehicle battery 416 over time. Any suitable model can be utilized to respectively determine one or more measures of the SOH of the vehicle battery 416, wherein such models include, in a non-limiting list, Lumped-Parameter model, Equivalent Circuit Model, Electro-chemical model, convolutional neural networks (CNN), long short-term memory (LSTM) by dropout regularization-based fully connected layer, time convolution memory neural network (TCMNN) combining CNN and LSTM, etc. Various algorithms can also be utilized by the assessment component 412 to determine SOC of the vehicle battery 416 utilizing such measurements as voltage, current, charging profile, and discharging profile for a module/cell. Such algorithms (e.g., offline and/or indirect0 include Coulomb counting (ratio of total charge input and maximum capacity of the module), ampere-hour (Ah), open-circuit voltage (OCV), impedance/impedance ratio measurement, chemical, voltage, current integration, and the like. Further, machine learning based algorithms can be utilized, such as neural network fuzzy logic, support vector machine, etc.

The assessment component 412 can perform analysis of the sensor data continuously, according to a schedule, based on detected trigger event and/or conditions, or the like. In this regard, it should be appreciated that the assessment component 412 can regularly determine updated measures of the SOH of the vehicle battery 416, SOC of the vehicle battery and associated contextual data over the supply chain distribution period (or another timeframe). Results of the assessment can be reported by the blockchain reporting component 414 in real-time (e.g., in response to determination thereof by the assessment component 412) or according to a schedule, and/or in response to defined trigger events and/or conditions. In this regard, it should be appreciated that the battery data 401 can comprise regularly and/or continuously reported timestamped measurements of the SOH of the vehicle battery 416 over time along with the battery ID. This reported battery data 401 comprising the SOH information can be recorded on the blockchain 132 by one or more server nodes of the blockchain network 201 in a same or similar manner described above with respect the sensor data, and/or by the blockchain reporting component 414 directly in some embodiments.

Figure 5:
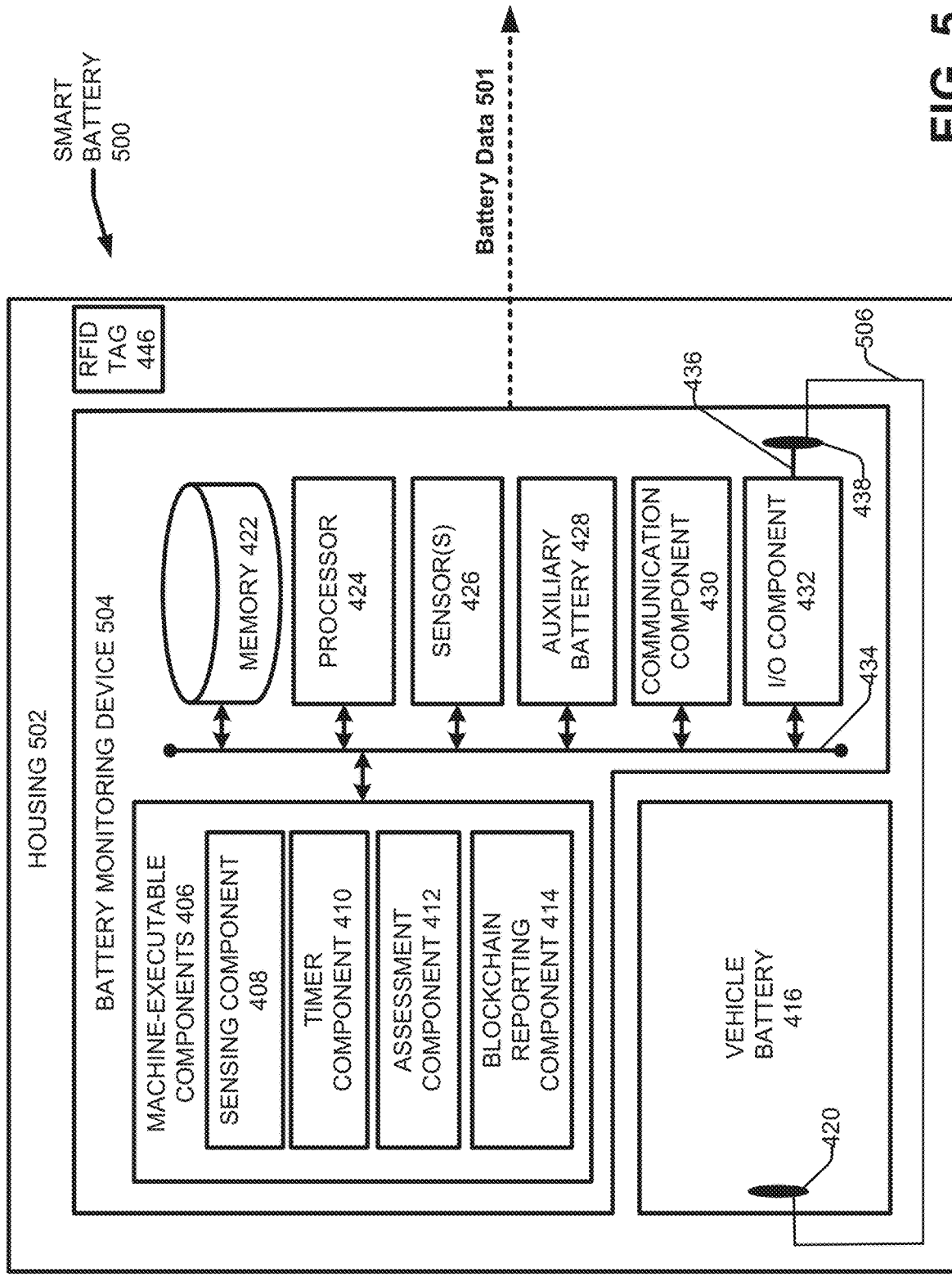
FIG. 5 illustrates another example smart battery in accordance with various aspects and embodiments described herein.

FIG. 5 illustrates another example smart battery 500 in accordance with various aspects and embodiments described herein. With reference to FIGS. 1-5, smart battery 500 is similar to smart battery 400 with the modification of integration of the various elements of the battery system 404 excluding the vehicle battery 416 within a battery monitoring device 504. In some embodiments, the one or more smart batteries 204 can correspond to smart battery 500, or vice versa. Similarly, the vehicle battery 416 can correspond to a conventional battery, such as battery 212. In various embodiments, the battery monitoring device 504 can be removably attached to or coupled to the vehicle battery 416 (e.g., upon completion of manufacture or at another time) to facilitate tracking and monitoring the condition and context of the vehicle battery 416 prior to installation of the vehicle battery 416 in a vehicle. For example, the battery monitoring device 504 can be coupled to the vehicle battery 416 within the same housing 502 as illustrated in FIG. 5. With these embodiments, the housing 502 may correspond to a shipping package, container or the like, adapted to contain the vehicle battery 416 and the battery monitoring device 504 prior to installation of the vehicle battery 416 in a vehicle, at which time the housing and the battery monitoring device 504 may be removed from the vehicle battery 416. The battery monitoring device 504 may be electrically connected to the vehicle battery 416 via a wired connection 506 to receive power from the vehicle battery 416, and/or to facilitate capturing sensor data from the vehicle battery 416 (e.g., via one or more sensors 426) regarding SOC, charging profile, discharging profile, charging events, capacitance, etc. In other embodiments, the battery monitoring device 504 can be electrically disconnected from the vehicle battery 416 (e.g., employing the auxiliary batter 428 as a power source). In either of these embodiments, the battery monitoring device 504 may be physically attached to the vehicle battery 416 and/or the housing 502 via a suitable fastening mechanism (e.g., fasteners, magnets, Velcro®, adhesive, straps, etc.) or be physically separated from the vehicle battery 416 within the housing.

In some implementations, of these embodiments, the RFID tag 446 can be attached to the vehicle battery 416 itself as opposed to the housing 502. The battery monitoring device 504 can further be programmed with information comprising the unique ID for the vehicle battery 416 to enable reporting and tracking information for the corresponding battery on the blockchain 132. In some implementations, the battery monitoring device 504 can comprise a suitable scanner device (e.g., one or more of the sensors 426 can correspond to an RFID scanner, a camera or the like) that reads and captures the unique ID for the vehicle battery 416 from the RFID tag 446 associated therewith at the time of coupling of the battery monitoring device 504 to the vehicle battery 416 (e.g., within the same housing 502 or otherwise). The features and functionalities of the respective components of the battery monitoring device 504 can encompass the same or similar features and functionalities of the corresponding components as described with reference to smart battery 400. Repetitive description of like elements employed in respective embodiments is omitted for sake of brevity.

In this regard, the battery data 501 can comprise same or similar information as battery data 401. In addition, because the battery monitoring device 504 is separate from the vehicle battery 416, the battery monitoring device 504 can have an additional unique device ID that uniquely identifies the battery monitoring device 504. In association with reporting the battery data 501, the battery monitoring device 504 can include its unique device ID in the reported data to indicate the source of the data. The blockchain network 201 can further verify the source of the battery data 501 as being authorized to report to the blockchain based on information included in the blockchain execution instructions 140 indicating the battery monitoring device 504 with its corresponding unique device ID is authorized and verified. Other mechanisms for verifying reported battery data 501 and additional data reported by devices to the blockchain network 201 are envisioned (e.g., encryption/decryption techniques, private/public key authentication technology and others).

Figure 6:
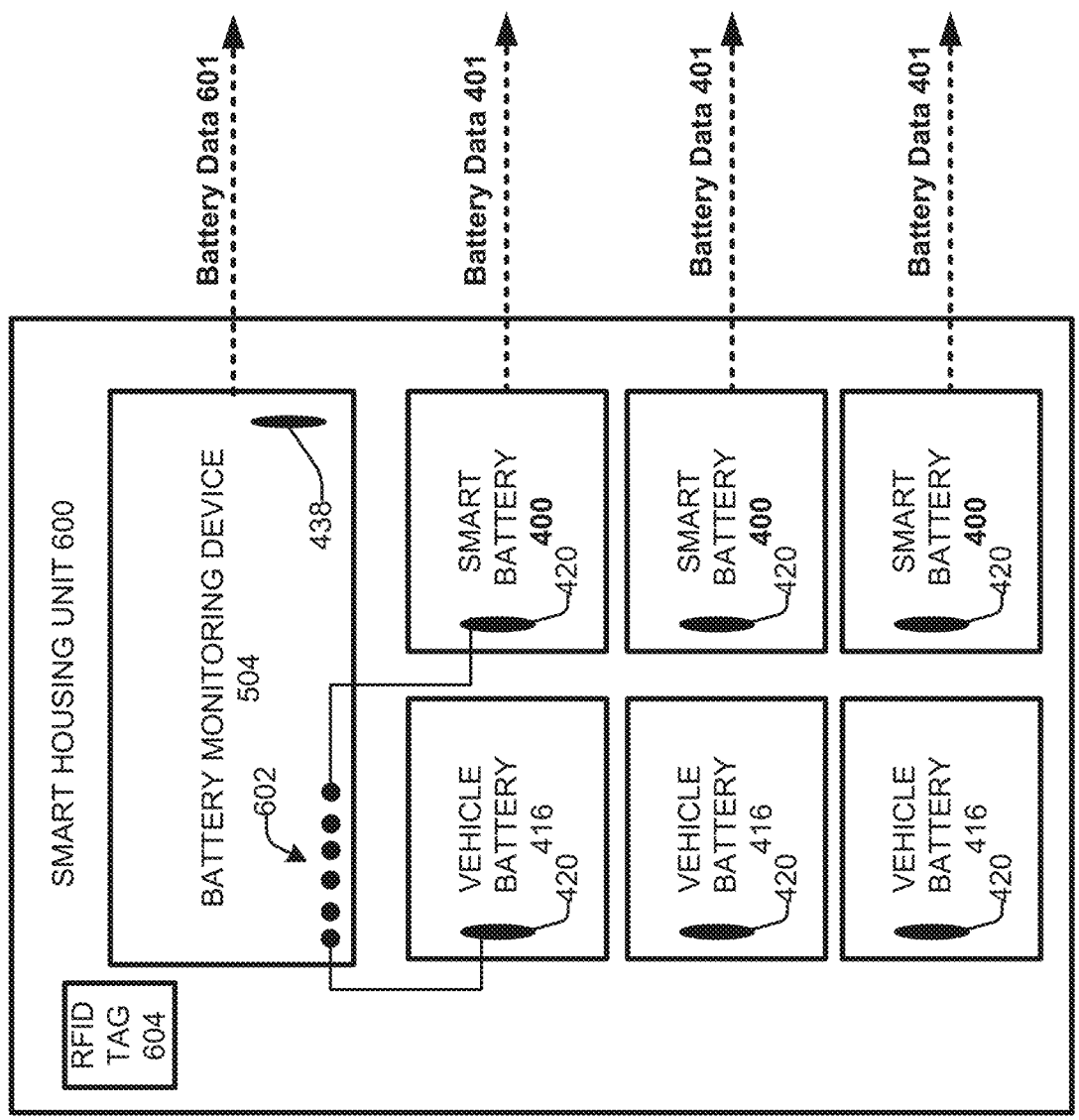
FIG. 6 illustrates an example smart housing unit in accordance with various aspects and embodiments described herein.

FIG. 6 illustrates an example smart housing unit 600 in accordance with various aspects and embodiments described herein. With reference to FIGS. 1-6, in some embodiments, the smart housing unit 600 can correspond to the one or more smart housing units 210, or vice versa. The smart housing unit 600 provides same or similar features and functionalities as the smart battery 500, with the modification of adaptation of the battery monitoring device 504 to facilitate tracking and reporting battery data (e.g., battery data 601) for a plurality of batteries associated therewith. In this regard, the smart housing unit 600 can correspond to a suitable container, package, structure or the like, that can contain or otherwise hold a plurality of batteries. The batteries can include conventional vehicle batteries (e.g., corresponding to vehicle battery 416, and also corresponding to vehicle battery 212), smart batteries (e.g., corresponding to smart battery 400) or combinations thereof. It should be appreciated that the number of batteries included in the smart housing unit 600 can vary and is not limited to six. In some implementations, one or more of the vehicle batteries 416 and/or the smart batteries 400 may be electrically coupled to the battery monitoring device 504 via corresponding I/O ports 602 of the battery monitoring device 504 (e.g., to receive electrical power and/or to detect sensor data related to the SOC of the respective batteries).

With these embodiments, a single battery monitoring device 504 can be utilized to track and report battery data 601 for a plurality of vehicle batteries located on or within the same smart housing unit 600. The battery data 601 can include same or similar information as the battery data 401 and identify or indicate the respective batteries (e.g., via their corresponding battery IDs) to which the battery data pertains. For example, in some implementations, the smart housing unit 600 can include an RFID tag 604, that includes respective battery IDs for all batteries included in the smart housing unit 600. In association with reporting the battery data 601, the battery monitoring device 504 can group all the batteries together and assume all batteries included in the smart housing unit 600 share the same battery data 601 (e.g., all batteries were subjected to the same environmental conditions, mechanical forces and contextual events over the course of the tracking period). In this regard, the battery data 601 can include device IDs for all the batteries to which the battery data 601 pertains. Mechanisms for receiving the device IDs by the battery monitoring device 504 for the respective batteries monitored by the battery monitoring device 504 can vary. In other implementations, some portions of the battery data 601 may pertain to individual batteries. Various configurations are envisioned. In addition, in some implementations in which the smart housing unit 600 includes smart batteries 400, the smart batteries themselves can additionally or alternatively generate, store and/or report corresponding battery data 401 in accordance with the techniques described with reference to FIG. 4. Repetitive description of like elements employed in respective embodiments is omitted for sake of brevity.

Figure 7:
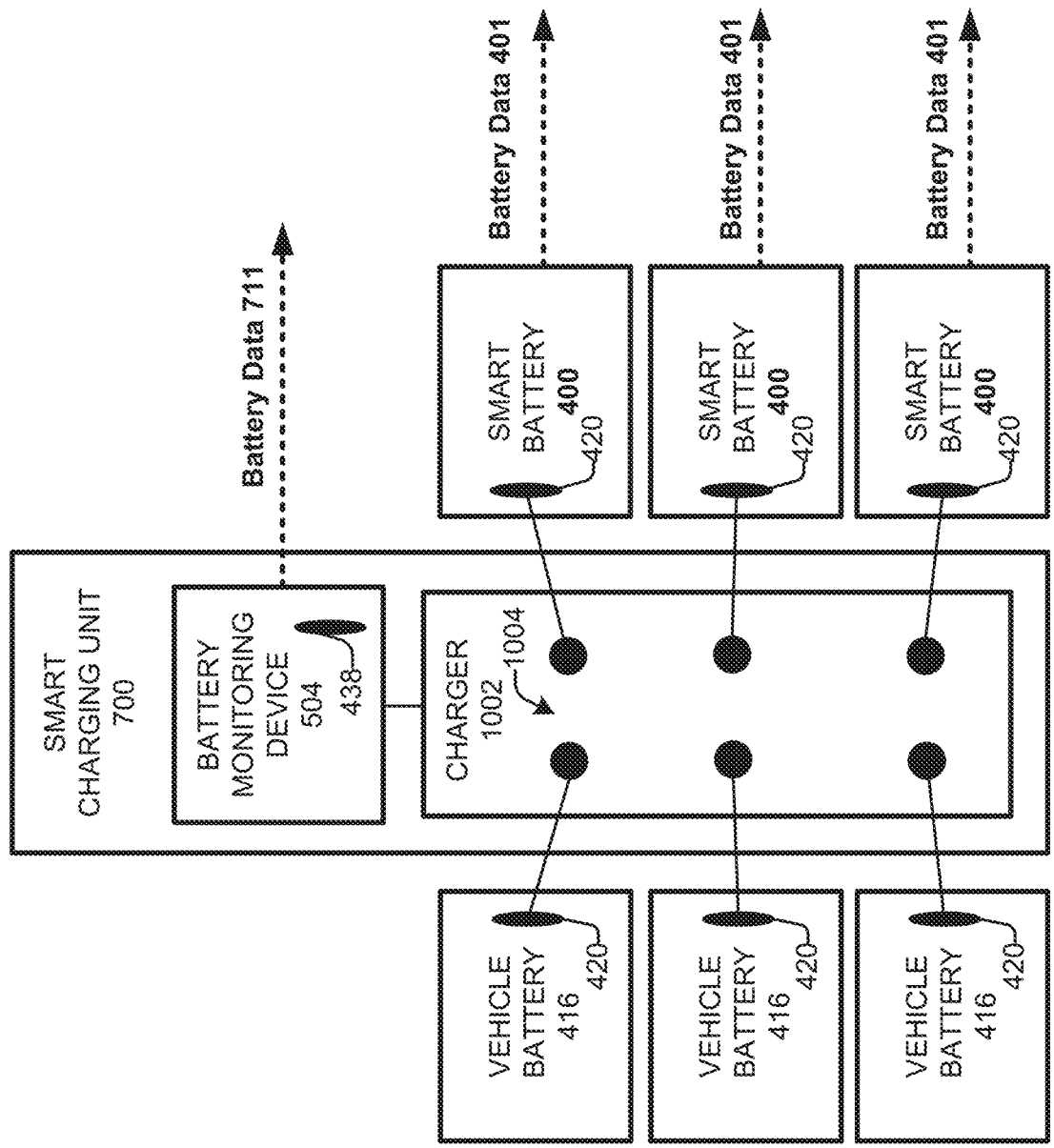
FIG. 7 illustrates an example smart charging unit in accordance with various aspects and embodiments described herein.

FIG. 7 illustrates an example smart charging unit 700 in accordance with various aspects and embodiments described herein. With reference to FIGS. 1-7, in some embodiments, the smart charging unit 700 can correspond to the one or more smart charging units 214, or vice versa. The smart charging unit 700 can provide same or similar features and functionalities as the smart housing unit 600, yet with the added ability of providing charging operations for respective batteries connected thereto. In this regard, the smart charging unit 700 can include battery monitoring device 504 and a charger 1002. The charger 1002 can correspond to a conventional EV battery charger yet adapted to charge EV batteries that are removed from vehicles. The charger 1002 can include a plurality of charging ports 1004 to which respective vehicle batteries (e.g., vehicle batteries 416 and/or smart batteries 400) can be electrically coupled (e.g., via suitable charging cables) to receive electrical charge. The number of batteries capable of being charged by the smart charging unit 700 can vary.

The battery monitoring device 504 can be electrically coupled to the charger 1002 to receive electrical power and/or to detect sensor data related to the charging operations and/or SOC of the respective batteries. In other implementations, the battery monitoring device 504 may be decoupled from the charger 1002. With these embodiments, a single battery monitoring device 504 can be utilized to track and report battery data 711 for a plurality of vehicle batteries associated with the same smart charging unit 700. The battery data 711 can include same or similar information as the battery data 601 and identify or indicate the respective batteries (e.g., via their corresponding battery IDs) to which the battery data pertains. Mechanisms for receiving the device IDs of the respective batteries connected to the charger 1002 by the battery monitoring device 504 can vary. In some implementations, the charger 1002 can detect the device IDs of the respective batteries connected to the respective charger ports 1004 and provide the corresponding device IDs to the battery monitoring device 504. Other mechanism are envisioned. In some implementations of these embodiments, the battery data 711 can include subsets of battery data pertaining to the charging operations and SOC of the respective batteries individually. In addition, in some implementations in which the smart charging unit 700 is coupled to smart batteries 400, the smart batteries themselves can additionally or alternatively generate, store and/or report corresponding battery data 401 in accordance with the techniques described with reference to FIG. 4. Repetitive description of like elements employed in respective embodiments is omitted for sake of brevity.

Figure 8:
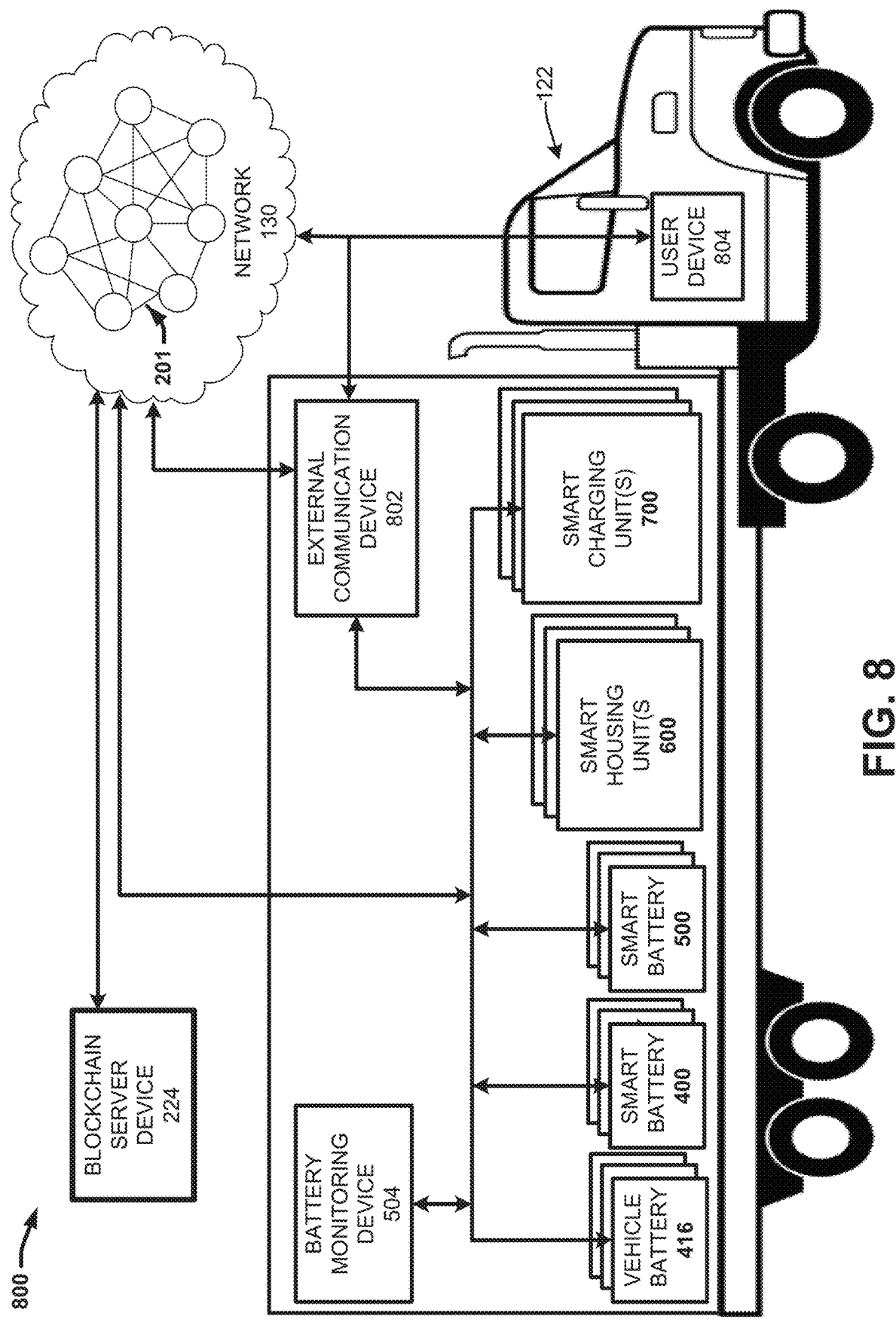
FIG. 8 illustrates another example system that facilitates tracking information regarding the condition history of a vehicle battery using blockchain technology in accordance with various aspects and embodiments described herein.

FIG. 8 illustrates another example system 800 that facilitates tracking information regarding the condition history of a vehicle battery using blockchain technology in accordance with various aspects and embodiments described herein. Repetitive description of like elements employed in respective embodiments is omitted for sake of brevity.

With reference to FIGS. 1-8, system 800 demonstrates a plurality of different deployment scenarios in which information regarding the condition history of batteries can be received by the blockchain network 201 for a plurality of batteries from different sources. The different sources can include, but are not limited to, a battery monitoring device 504 located on or within the transport vehicle 122, one or more smart batteries 400, one or more smart batteries 500, one or more smart housing units 600, one or more smart charging units 700, external communication device 802 and user device 804. It should be appreciated that actual deployment scenarios can include different subsets of these sources/devices. In the embodiment shown, the respective sources of the battery data are located on or within the transport vehicle 122. It should be appreciated that the transport vehicle 122 corresponds to one example environment/location in which the respective sources can be deployed. In this regard, the transport vehicle 122 may be replaced with a storage facility or another environment where the batteries may be located before installation into a vehicle.

Each of the devices shown in system 800 can be connected to the network 130 and blockchain network 201 either directly or indirectly (e.g., via another communication device serving as a relay device, gateway device, access point device or the like). For example, in some implementations, the respective smart batteries 400, smart batteries 500, smart housing units 600, smart charging units 700 and the battery monitoring device 504 can respectively have separate wireless communication links to the blockchain network 201 using their corresponding communication components (e.g., corresponding to communication component 430). In other implementations, one or more of these devices can connect to the blockchain network 201 via an external communication device 802 located within the transport vehicle 122 and/or a user device 804 located on or within the transportation vehicle 122. For example, the respective devices may be communicatively coupled to the external communication device 802 and/or the user device 804 via a first wired or wireless communication technology (e.g., BLUETOOTH®) and the external device 802 and/or the user device 804 can connect to the network 130 via a second wireless communication technology (e.g., Wi-Fi). Various configurations are envisioned.

System 800 also demonstrates a deployment scenario in which a battery monitoring device 504 can be employed to collect and report battery data for conventional vehicle batteries (e.g., corresponding to vehicle batteries 416) located in the same environment as the battery monitoring device 504, which in this case correspond to the inside of the transport vehicle 122 truck bed. The vehicle batteries 416 may be electrically and/or physically connected to the battery monitoring device 504 (e.g., in accordance with the smart housing unit 600 configuration) or completely detached therefrom.

The user device 804 can correspond to a computing device or system associated with the transport vehicle 122 (e.g., an onboard vehicle computing device) and/or a passenger/driver of the transport vehicle (e.g., a smartphone, a tablet, a personal computing device, etc.). In some embodiments, the user device 804 can be authorized to provide information to the blockchain network 201 that is relevant to tracking the condition history of the batteries transported. For example, the user device 804 can provide information regarding location, route, speed, traffic conditions, road conditions, weather conditions and the like, which may be associated with the tracked condition history of the respective batteries being transported.

Figure 9:
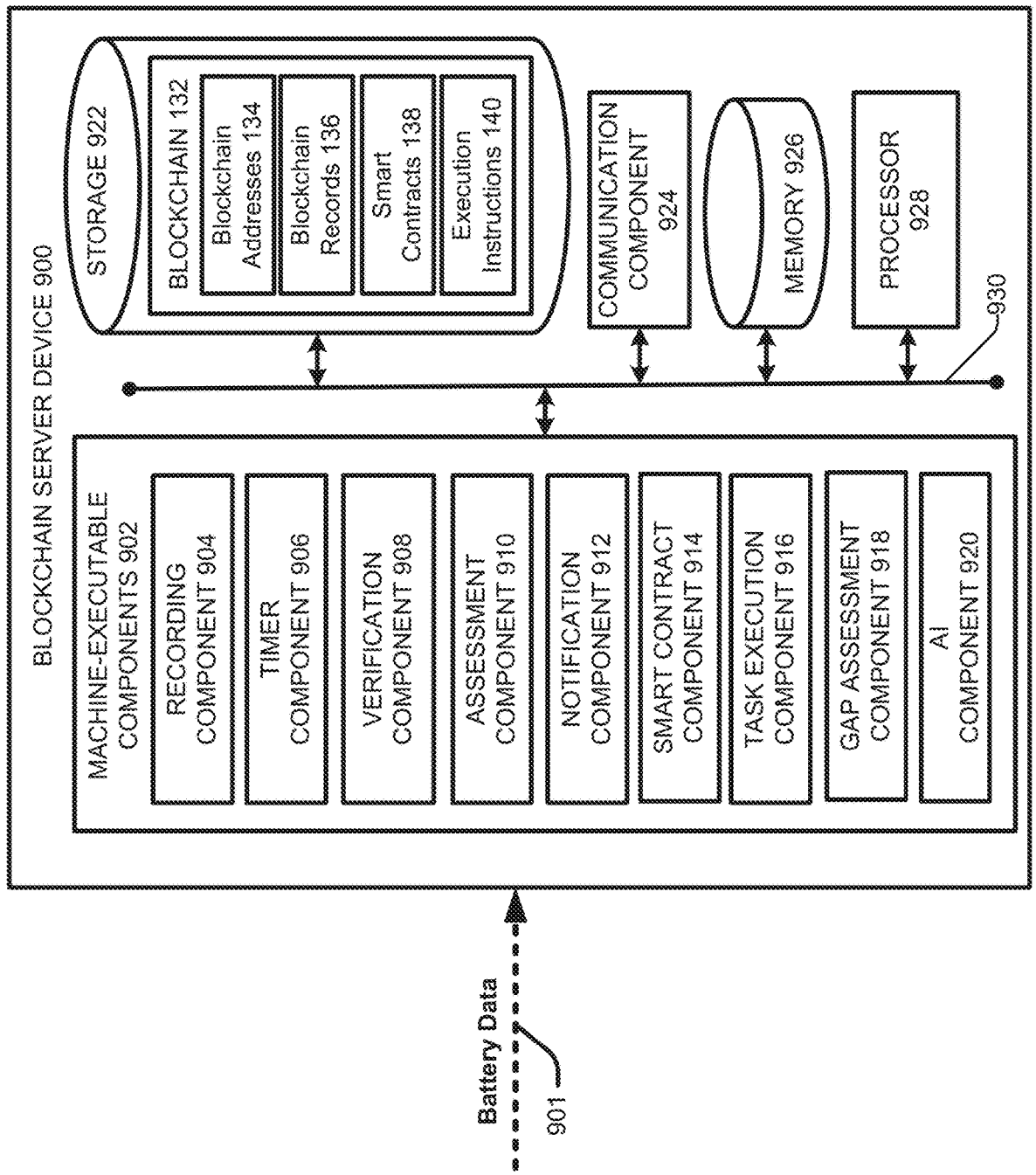
FIG. 9 illustrates an example blockchain server device that facilitates tracking information regarding the condition history of a vehicle battery using blockchain technology in accordance with various aspects and embodiments described herein.

FIG. 9 illustrates an example blockchain server device 900 that facilitates tracking information regarding the condition history of a vehicle battery using blockchain technology in accordance with various aspects and embodiments described herein. With reference to FIGS. 1-9, in one or more embodiments, blockchain server device 900 can correspond to blockchain server device 224 illustrated in system 200, and system 800. It should be appreciated that the blockchain server device 900 (and blockchain server device 224) can correspond to one instance of a full node of the blockchain network 201 (e.g., of full nodes 305*b-e* and 305*g-h*) and that the blockchain network 201 can include a plurality of full nodes corresponding to blockchain server device 900.

The blockchain server device 900 includes machine-executable components 902, storage 922, communication component 924, memory 926, processor 928 and a device bus 930 that couples the machine-executable components 902, the storage 922, the communication component 924, the memory 926 and the processor 928 to one another. In some embodiments, machine-executable components 902 can be stored in memory 928 and executed by the processor 928 to cause the blockchain server device 900 to perform operations described with respect to the corresponding components. In this regard, the blockchain server device 900 can correspond to any suitable computing device or machine (e.g., a communication device, a desktop computer, a personal computer, a smartphone, a server, a virtual computing device, etc.), or interconnected group of computing devices/machine (e.g., interconnected via wired and/or wireless communication technologies). Examples of said memory 926 and processor 928 as well as other suitable computer or computing-based elements, can be found with reference to FIG. 19 (e.g., processing unit 1904 and system memory 1906 respectively), and can be used in connection with implementing one or more of the systems or components shown and described in connection with FIG. 9, or other figures disclosed herein.

As described with reference to FIG. 3 and blockchain network 201, the blockchain 132 can be stored, updated and managed by a plurality of computing devices corresponding to blockchain server device 900 in a peer-to-peer network model. In the embodiment shown, the blockchain 132 is stored by the blockchain server device 900 in storage 922. The storage 310 can correspond to any suitable machine-readable media that can be accessed by the blockchain server device 900 and includes both volatile and non-volatile media, removable and non-removable media implemented in any method or technology for storage of information, such as computer-readable instructions, data structures, models, algorithms, program modules, or other data. Computer storage media can include, but is not limited to, random access memory (RAM), read only memory (ROM), erasable programmable read only memory (EPROM), flash memory or other memory technology, digital video disk (DVD) or other optical disk storage, magnetic cassettes, magnetic tape, magnetic disk storage or other magnetic storage devices, or any other medium which can be used to store the desired information and which can be accessed by the server device 900.

The communication component 924 can correspond to any suitable communication technology hardware and/or software that can perform wired and/or wireless communication of data between the blockchain server device 900 and other systems and devices. In this regard, the communication component 924 can provide for communicating information between the blockchain server device 900 and respective sources of battery data 901 (e.g., one or more battery monitoring devices 504, smart batteries 400, smart batteries 500, smart housing units 600, smart chagrining units 700, external communication device 802, user device 804, scanner devices 206, etc.). The communication component 924 can also provide for communicating information between the blockchain server device 900 and other computing devices of the blockchain network 201. Examples of suitable communication technology hardware and/or software employable by the communication component 924 are described infra with reference to FIG. 10.

The machine-executable components 112 can recording component 904, timer component 906, verification component 908, assessment component 910, notification component 912, smart contract component 914, task execution component 916, gap assessment component 918 and artificial intelligence (AI) component (AI component 920).

The recording component 904 can record received battery data 901 on the blockchain 132. The battery data 901 can correspond to any of the battery data previously described (e.g., battery data 401, battery data 501, battery data 601, battery data 711, and the like). In this regard, the recording component 904 can receive battery data 901 from the various sources described herein (e.g., battery monitoring devices 504, smart batteries 400, smart batteries 500, smart housing units 600, smart charging units 700, scanner devices 206, and various other sources). The battery data 901 can represent battery data received from any sources authorized to write to the blockchain 132. The battery data 901 can represent respective streams of battery data 901 received for different vehicle batteries monitored by the system (e.g., system 200, system 800 and the like). In this regard, as applied to a single battery, the battery data 901 can include information that relates to the condition of the vehicle battery as received over a period of time prior to installation of the vehicle battery into a vehicle (e.g., the supply chain distribution period or another timeframe. The "condition" of the battery can encompass the quality of the physical condition of the battery (e.g., physical damage), the quality of the operating condition of the vehicle battery or the SOH of the battery, and in some implementations, the SOC of the battery. For example, in some implementations, the battery data 901 can include sensor data captured via one or more sensors 426 that reflect environmental conditions exposed to the battery, motion/movement of the battery, mechanical forces impacted on the battery, charging operations performed, and the like, with corresponding timestamps representing the time of capture of the sensor measurements. In some implementation in which the source providing the sensor data comprises an assessment component 412, the battery data 901 can also include one or more measurements of damage and/or deterioration of the vehicle battery determined based on analysis of the sensor data. The battery data 901 can also include relevant contextual information regarding events that occur and timing of the events in association with transfer of the battery from the battery manufacturer 120 to a target destination, such as the vehicle installer 128 (e.g., movement of the battery from one location to another, charging events, storage/holding periods, entities involved in events, locations of the events, etc.).

In this regard, the recording component 904 can log some or all of the battery data 901 received for a battery over time on the blockchain 132 as the data is received with timestamps indicating the timing of reception of respective portions of the battery data 901. In some embodiments, the respective portions of the battery data 901 may be received with timestamps (e.g., generated and applied by the timer component 410). In other implementations, the blockchain server device 900 can include timer component 906 to generate and apply timestamps to respective battery data entries recorded on the blockchain 132 as function of the timing of reception of the corresponding data. In this regard, the recording component 904 can record battery data entries for respective batteries tracked as blockchain records, wherein each entry or record can represent a subset of newly received battery data for the respective batteries in time. For example, each subset may comprise a single sensor measurement or a group of sensor measurements captured of a particular timeframe (e.g., past one minute, past 10 minutes, past 30 minutes, etc.). In another example, each subset may comprise a new calculation of a measure of the SOH of the battery and/or damage to the battery. In another example, each subset may comprise information pertaining to a new contextual event that occurred over the transfer of the battery (e.g., in accordance with the timeline 114 of events or the like). The specific information recorded in each battery data entry for a battery can vary. Rules regarding what information to include in each data entry record for a battery can be defined in the execution instructions 140.

In association with recording data entry record for a battery, the verification component 908 can perform a verification protocol to ensure each entry is verified. In various embodiments, the verification protocol can involve verifying the data entry based on a determination that the source of the data is an authorized source. In this regard, as described above, in some embodiments, each source of the battery data 901 can be associated with a unique ID which can be included with the received data. The verification component 908 can further determine whether the source if authorized based on information included in the execution instructions 140 identifying authorized sources by their respective unique IDs. In some embodiments, each battery can be associated with a corresponding unique blockchain address 134 and the recording component 904 can link each data entry (e.g., each record of blockchain records 136) with the corresponding blockchain address for the battery to which it pertains. In other embodiments, the verification component 908 can employ other verification techniques and protocols to verify a data entry for a battery on the blockchain. For example, other suitable verification protocols can involve usage of private and public keys, digital certificates and the like. In one or more embodiments, each time the recording component 904 generates a new data entry for a battery, the blockchain recording component 904 can create a new block on the blockchain, as illustrated in FIG. 10.

Figure 10:
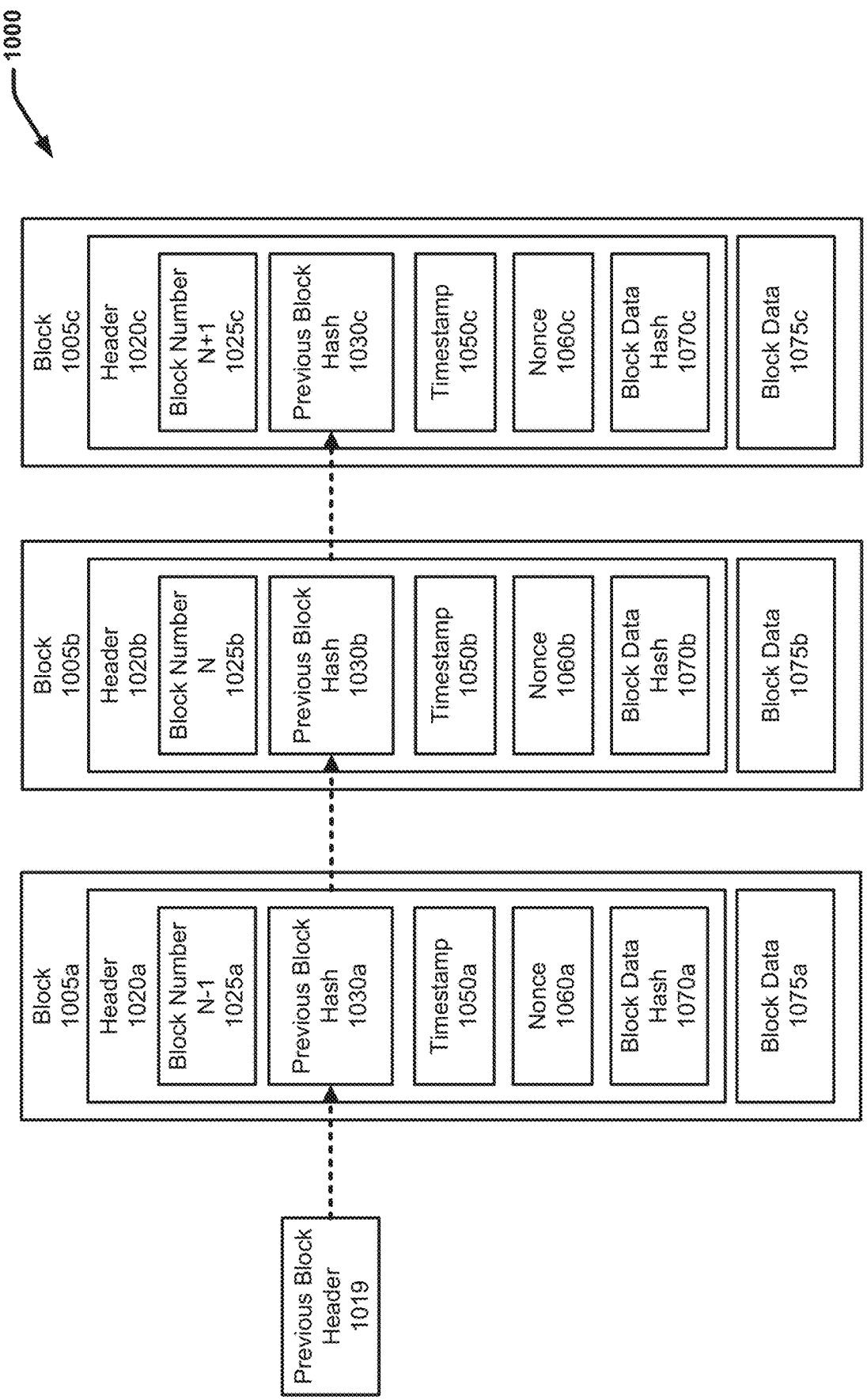
FIG. 10 illustrates an example blockchain in accordance with one or more embodiments described herein.

In this regard, FIG. 10 illustrates an example blockchain 1000 in accordance with one or more embodiments described herein. In some embodiments, one or more aspects of blockchain 132 can correspond to blockchain 1000. For example, one or more of the blockchain records 136 corresponding to tracked battery data (e.g., battery data 901) for respective batteries tracked using the disclosed techniques may correspond to the structure of blockchain 1000. In this regard, the blockchain 1000 may comprise a plurality of blocks 1005a, 1005b, and 1005c (generally referred to as blocks 1005). The blockchain 1000 comprises a first block (not shown), sometimes referred to as the genesis block. Each of the blocks 1005 may comprise a one or more blockchain records (e.g., of blockchain records 136) corresponding to a subset of tracked battery data for a particular battery or group of batteries. For example, the subset may represent a single sensor measurement, a group of sensor measurements, a single measure of the SOH of the battery at a specific time point, a tracked contextual event that occurred in association with the transport of the battery (e.g., movement of the battery from a first location to a second location), or the like. The blocks 1005 of the blockchain 1000 may be linked together and cryptographically secured. In some cases, the post-quantum cryptographic algorithms that dynamically vary over time may be utilized to mitigate ability of quantum computing to break present cryptographic schemes. A copy of the blockchain 1000 may be stored locally (e.g., at the blockchain server device 224), in the cloud, on a grid, for example by the nodes 305b-e and 305g-h, as a file or in a database.

Each of the blocks 1005 may comprise one or more data fields. The organization of the blocks 1005 within the blockchain 1000 and the corresponding data fields may be implementation specific. As an example, the blocks 1005 may comprise a respective header 1020a, 1020b, and 1020c (generally referred to as headers 1020) and block data 1075a, 1075b, and 1075c (generally referred to as block data 1075). The headers 1020 may comprise metadata associated with their respective blocks 1005. For example, the headers 1020 may comprise a respective block number 1025a, 1025b, and 1025c. As shown in FIG. 10, the block number 1025a of the block 1005a is N−1, the block number 1025b of the block 1005b is N, and the block number 1025c of the block 1005c is N+1. The headers 1020 of the blocks 1005 may include a data field comprising a block size (not shown).

The blocks 1005 may be linked together and cryptographically secured. For example, the header 1020b of the block N (block 1005b) includes a data field (previous block hash 1030b) comprising a hash representation of the previous block N−1's header 1020a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 1020c of the block N+1 (block 1005c) includes a data field (previous block hash 1030c) comprising a hash representation of block N's (block 1005b) header 1020b.

The headers 1020 of the blocks 1005 may also include data fields comprising a hash representation of the block data, such as the block data hash 1200a-c. The block data hash 1070a-c may be generated, for example, by a Merkle tree and by storing the hash or by using a hash that is based on all of the block data. The headers 1020 of the blocks 1005 may comprise a respective nonce 1060a. 1060b, and 1060c. In some implementations, the value of the nonce 1060a-c is an arbitrary string that is concatenated with (or appended to) the hash of the block. The headers 1020 may comprise other data, such as a difficulty target.

The blocks 1005 may comprise respective block data 1075a, 1075b, and 1075c (generally referred to as block data 1075). The block data 1075 may comprise a record of validated battery data records for one or more batteries that have been integrated into the blockchain 1000. As discussed above, the block data 1075 may include a variety of different types of data in addition to battery data 901. Block data 1075 may include any data, such as text, audio, video, image, or file, that may be represented digitally and stored electronically.

Figure 11:
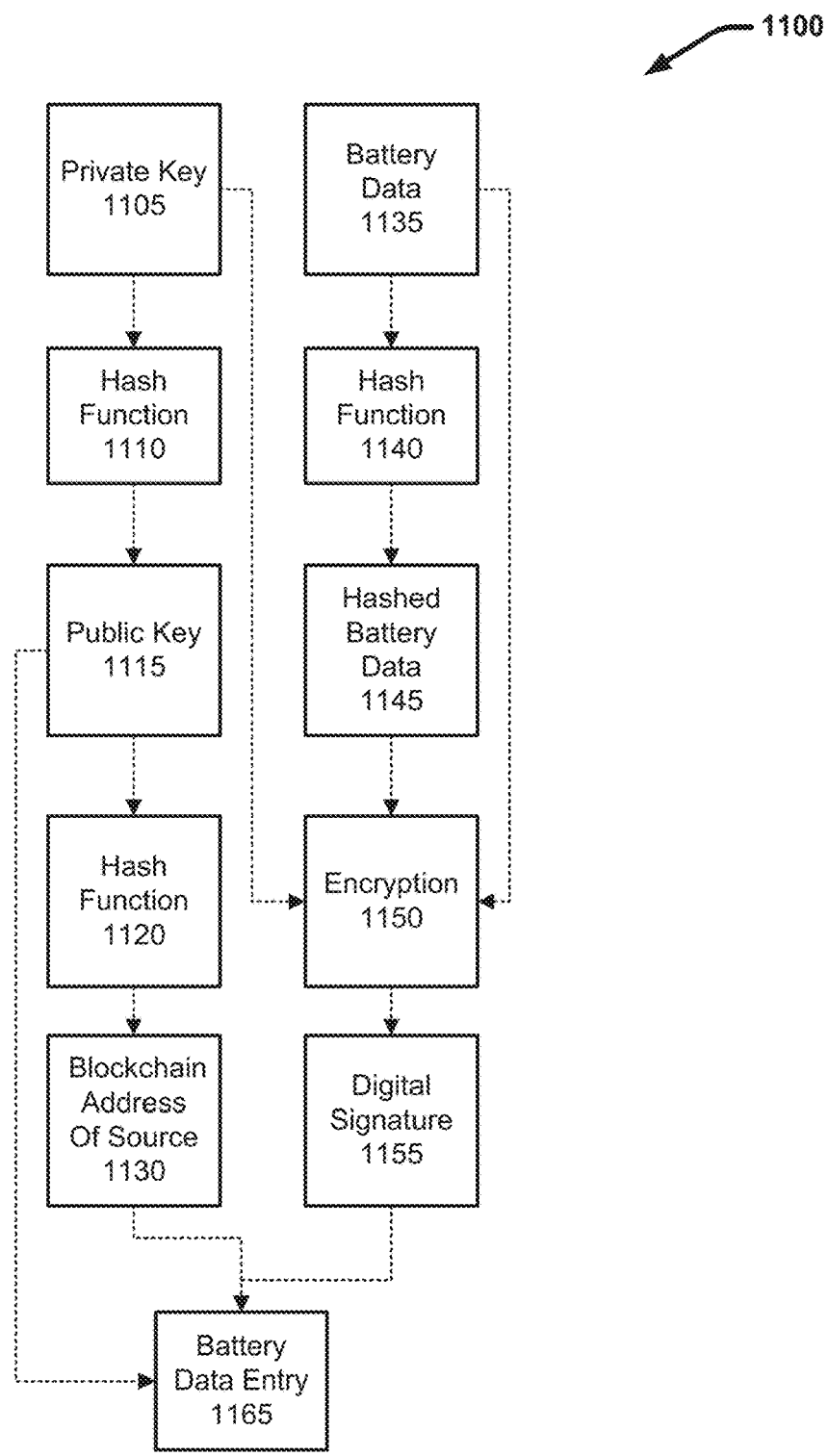
FIG. 11 illustrates a diagram of an example battery data blockchain entry in accordance with one or more embodiments described herein.

FIG. 11 illustrates a diagram of an example battery data blockchain record entry operation 1100 that may be performed by the recording component 904 in accordance with one or more embodiments described herein. The battery data entry 1165 may correspond to one or more blockchain records 136 to be entered as a new bock in the blockchain (e.g., of blocks 1005a-c of blockchain 1100 or the like). The battery data entry 1165 may include a public key 1115, a blockchain address 1130 associated with the battery ID to which the record pertains, and a digital signature 1155. In some embodiments, the recording component 904 may derive a public key 1115 from a private key 1105 provided by the source of the battery data 1135 by applying a cryptographic hash function 1110 to the private key 1105. The cryptographic hash function 1110 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The recording component 904 may derive an address or identifier for the battery ID, such as the blockchain address 1130, by applying a hash function 1120 to the public key 1115. Briefly, a hash function is a function that may be used for mapping arbitrary size data to fixed size data. The value may also be referred to as a digest, a hash value, a hash code, or a hash. In order to indicate that the battery ID is the originator of the battery data entry 1165, the recording component 904 may generate the digital signature 1155 for the battery data 1135 using the private key 1105 of the corresponding battery and/or source of the battery data. The battery data 1135 may include any elements of the battery data 901. Generating the digital signature 1155 may include applying a hash function 1140 to the battery data 1135 resulting in hashed battery data 1145. The hashed battery data 1145 and the battery data 1135 may be encrypted (via an encryption function 1150) using the private key 1105, resulting in the digital signature 1155.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

With reference to FIGS. 3, 9 and 11, a battery data entry (e.g., battery data entry 1165) may be broadcast by a blockchain server (e.g., blockchain server device 224) to multiple nodes 305 of the blockchain network 201 (e.g., via blockchain recording component 904). Typically, once the battery data entry is broadcast or submitted to the blockchain network 201, it may be received by one or more of the nodes 305. Once the battery data entry is received by the one or more nodes 305 of the blockchain network 201, it may be propagated by the receiving nodes 305 to other nodes 305 of the blockchain network 201.

The blockchain network 201 may operate according to a set of rules defined in the execution instructions 140. The rules may specify conditions under which a node may accept a data entry, a type of data entry that a node may accept, a type of compensation that a node receives for accepting and processing the data entry, etc. For example, a node may accept a data entry based on a transaction history, reputation, computational resources, relationships with service providers, etc. The rules may specify conditions for broadcasting a data entry to a node. For example, a data entry may be broadcast to one or more specific nodes based on criteria related to the node's geography, history, reputation, market conditions, docket/delay, technology platform. The rules may be dynamically modified or updated (e.g., turned on or off) to address issues such as latency, scalability and security conditions. A data entry may be broadcast to a subset of nodes as a form of compensation to entities associated with those nodes (e.g., through receipt of compensation for adding a block of one or more data entry to a blockchain).

Figure 12:
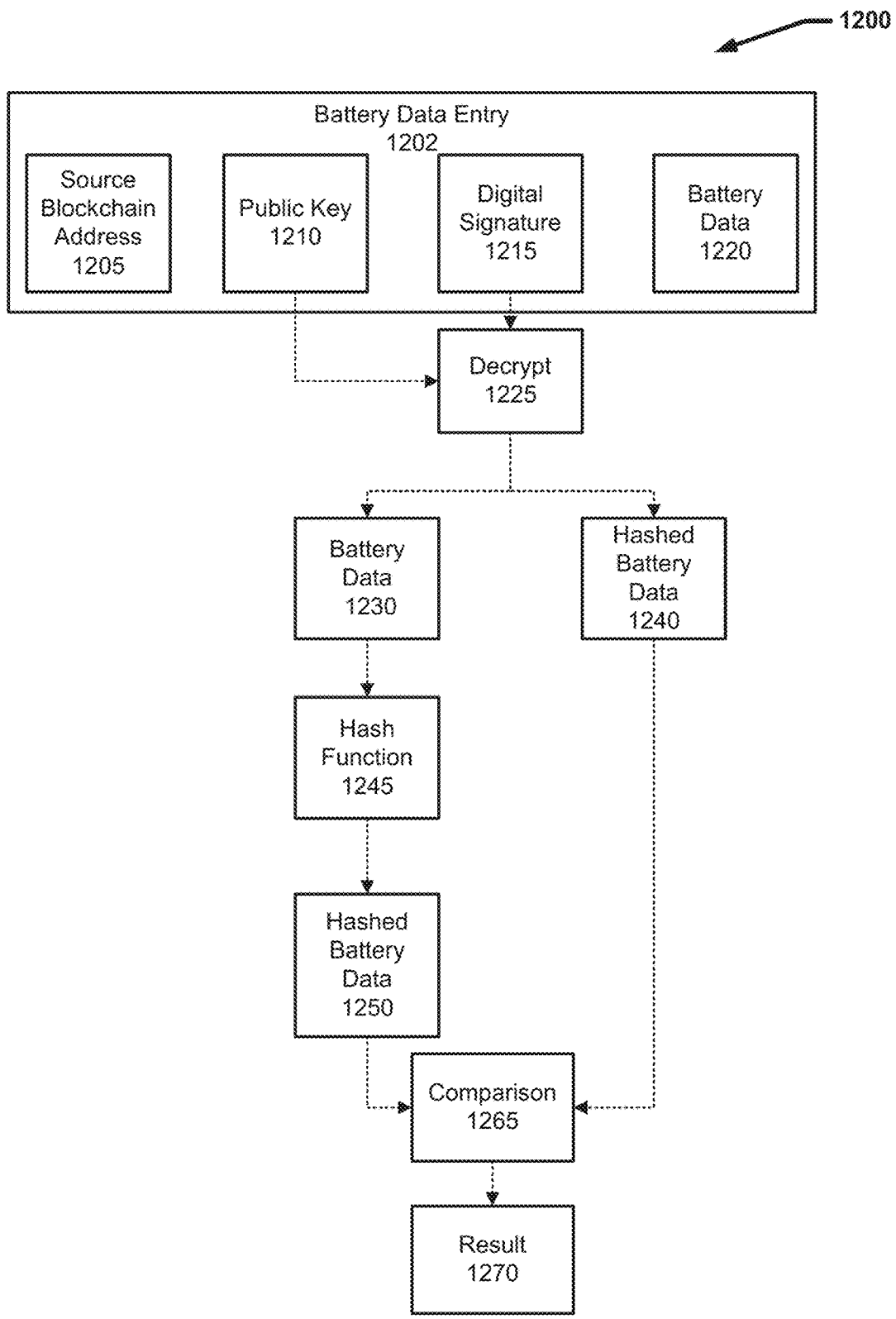
FIG. 12 illustrates a diagram of an example battery data blockchain entry verification mechanism in accordance with one or more embodiments described herein.

FIG. 12 illustrates a diagram of an example battery data blockchain entry verification mechanism 1200 in accordance with one or more embodiments described herein. In particular, FIG. 12 shows an example battery data entry 1202 broadcast by the recording component 904 to the blockchain network 201. With reference to FIGS. 3, 9, 11 and 12, the battery data entry 1202 may correspond to battery data entry 1165. The battery data entry 1202 may be broadcast to multiple nodes 305 of the blockchain network 201. Typically, once the data entry is broadcast or submitted to the blockchain network 201, it may be received by one or more of the nodes 305. Once the data entry is received by the one or more nodes 305 of the blockchain network 201, it may be propagated by the receiving nodes 305 to other nodes 305 of the blockchain network 201.

The battery data entry 1202 may include a blockchain address 1205 for the source of the data and/or the battery to which the data corresponds, a public key 1210, a digital signature 1215, and the battery data 1220. The receiving node (e.g., one or more of the nodes 305) may verify (e.g., using verification component 908) whether the battery data entry 1202 conforms to a pre-defined set of rules for the blockchain network 201 defined in the blockchain execution instructions 140. The node may also validate the battery data entry 1202 based on establishing data/source authenticity and authorization/verification. Source authenticity may be established by determining whether the source indicated by the transaction 1202 is in fact an authorized source. Source authenticity may be proven via cryptography, for example, asymmetric-key cryptography using a pair of keys, such as a public key and a private key. Data integrity of the battery data entry 1202 may be established by determining whether the battery data 1220 associated with the battery data entry 1202 was modified in any way. When the recording component 904 creates the battery data entry 1202, it may indicate the source and/or battery to which the data entry pertains by including the digital signature 1215.

At 1225, the node may decrypt the digital signature 1215 using the public key 1210. A result of the decryption may include hashed battery data 1240 and battery data 1230. The node may generate hashed battery data 1240 based on applying a hash function 1245 to the battery data 1230 and the second hashed battery data 1250. If the result 1270 of the comparison 1265 indicates a match, then the data integrity of the battery data entry 1202 may be established and node may indicate that the battery data entry 1202 has been successfully validated. Otherwise, the data of the battery data entry 1202 may have been modified in some manner and the node may indicate that the battery data entry 1202 has not been successfully validated.

With reference again to FIG. 9, in some embodiments, the blockchain server device 900 can include assessment component 910. The assessment component 910 can correspond to assessment component 412. In this regard, the assessment component 910 can perform an assessment on received sensor data for a battery to determine one or more measure of the SOH of the vehicle battery, such as a level of deterioration or damage of the vehicle battery attributed to environmental conditions exposed to the battery or the like. Results of the assessment can be recorded on the blockchain 132 for the corresponding battery as a new data entry.

The notification component 912 can generate and send notifications to relevant entities (e.g., at corresponding user equipment associated with the entities) based on information recorded on the blockchain 132 satisfying a predefined notification criterion. The notifications can include any form of electronic notification capable of being sent to and rendered by a device (e.g., email, text message, etc.). For example, the notification component 912 can notify the delivery driver regarding a determination that the temperature inside the delivery vehicle has exceeded an acceptable level that could result in damage or deterioration to the batteries transported therein. In another example, the notification component 910 can notify the vehicle installer that a group of batteries being transported thereto have deteriorated to an unacceptable level before arrival at the vehicle installer. The notification criterion can vary and be defined in the execution instructions.

The smart contract component 914 can control execution of smart contracts 138 defined on the blockchain 132. A smart contract is an agreement that is stored in a blockchain 132 and automatically executed (or self-executed) when the agreement's predetermined terms and conditions are met. The terms and conditions of the agreement may be visible to other users of the blockchain. When the pre-defined rules are satisfied, then the relevant code is automatically executed to perform a task or action defined by the contract for the parties involved. For example, the task or action may involve the transfer of money (e.g., digital currency or the like) from a financial account of one party to another based on satisfaction of the terms of the contract or another task. The task execution component 916 can facilitate executing tasks defined in smart contracts. The agreement may be written as a script using a programming language such as Java, C++, JavaScript, VBScript, PHP, Perl, Python, Ruby, ASP, Tcl, etc. The script may be uploaded to the blockchain as a transaction on the blockchain. The smart contract component 914 can also manage protocols for screening and parsing the information recoded on the blockchain 132 in association with determining when the rules and conditions of a smart contract have been met (or not), using a consensus model or another suitable model.

As an example, a smart contract may be utilized between the battery manufacture 120 and the vehicle installer 128 that controls provision of payment by the vehicle installer 126 to the battery manufacturer 120 in association with purchase of batteries by the vehicle installer 126 from the battery manufacturer 120. The smart contract may define terms and conditions regarding the acceptable environmental conditions to be exposed to the batteries over the transfer period, acceptable levels of damage or deterioration to the batteries, acceptable events and timing of events to occur relative to the transfer of the batteries (e.g., authorized locations for storage, timing of storage periods, acceptable charging/discharging operations to be performed, etc.). The terms and conditions can be based on any parameter included in the battery data 901 and/or determined based on the battery data 901 (e.g., by the assessment component 912 and/or assessment component 412) that may be recorded on the blockchain 132. In this regard, satisfaction of the terms and conditions can be determined by the smart contract component 914 automatically based on the recorded battery data for the respective batteries on the blockchain 132. In this regard, the smart contract component 914 can monitor the data recorded on the blockchain relevant to the smart contract to determine whether the received data indicates the terms of the contract have been satisfied (or not). If the terms have been satisfied, then the smart contract component 914 can direct the task execution component 916 to execute the corresponding action defined by the agreement, such as transferring of final payment from the vehicle installer 128 to the battery manufacturer 120 or another task. The terms of the respective smart contracts 138 and the tasks to be performed based on satisfaction, partial satisfaction or dissatisfaction of the terms can vary. In some embodiments, the tasks can involve automatically reordering new batteries to be delivered, providing a reimbursement or partial refund for damaged batteries, invalidating or validating a warranty of a battery, and adjusting the shipping and delivery schedule or another task. The tasks may also involve other indemnification actions that can be carried out by the task execution component 916 in association with accessing corresponding electronic systems (e.g., represented by other systems devices 222) associated with the parties and/or the tasks (e.g., financial systems, scheduling systems, ordering systems, warranty systems, etc.).

Figure 13:
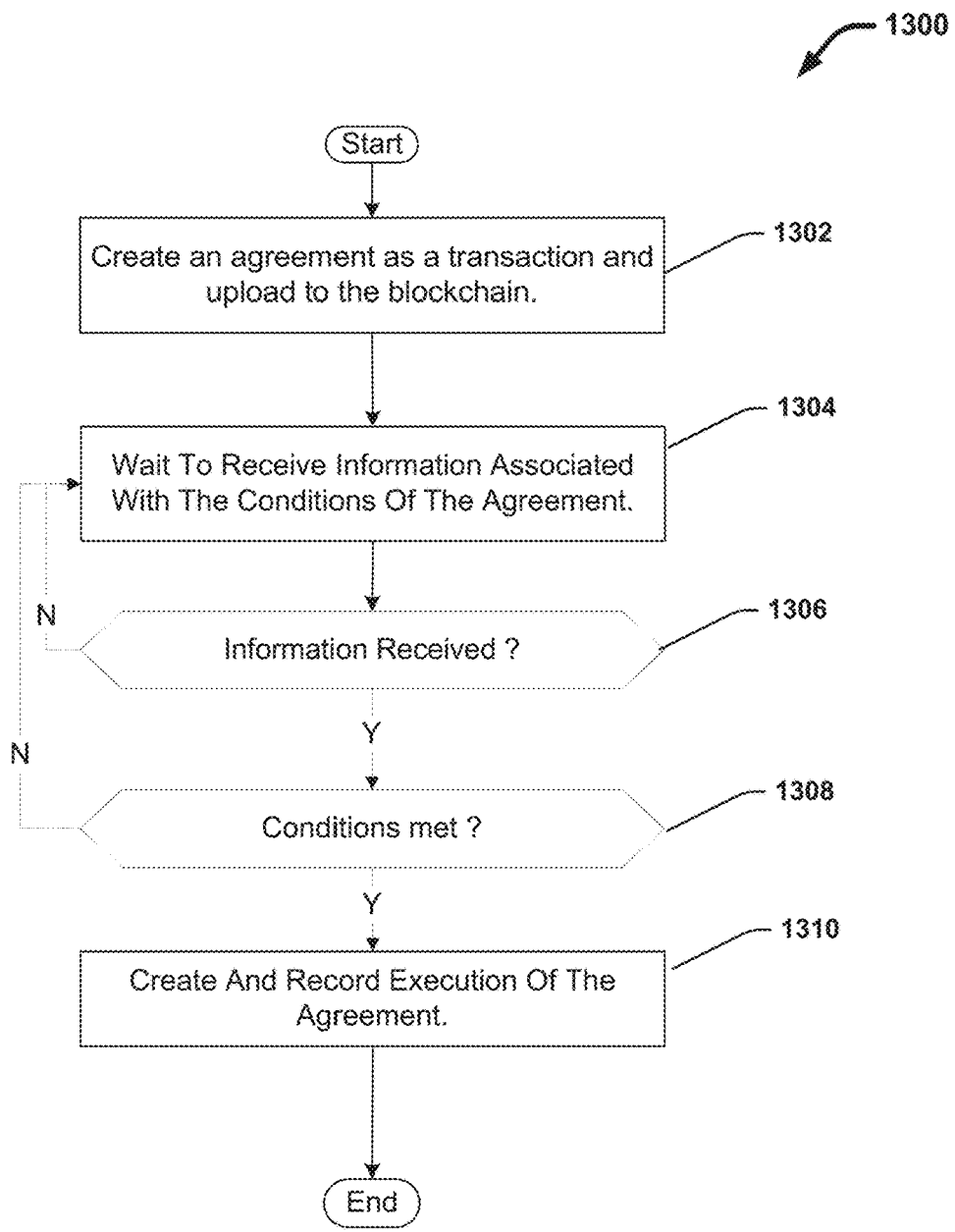
FIG. 13 presents a flow diagram of an example smart contract transaction process in accordance with one or more embodiments described herein.

FIG. 13 is a flow diagram showing steps of an example method 1300 for performing a smart contract transaction between entities, such as the battery manufacture 120 and the vehicle installer 126 related to the condition of batteries being provided by the battery manufacture 120 to the vehicle installer 126. The steps of the method 1300 may be performed the blockchain server device 900 using the smart contract component 914 and the task execution component 916. Alternatively, or additionally, some or all of the steps of the method 1300 may be performed by multiple full nodes of the blockchain network 201 in association with determining whether the terms and conditions of the smart contract are satisfied or not using a consensus mechanism or another mechanism. Steps of the method 1300 may be modified, omitted, and/or performed in other orders, and/or other steps added.

At step 1302 the agreement or smart contract between the battery manufacturer 120 and the vehicle installer 126 may be created and then submitted to the blockchain network 201 as a transaction. The transaction may be added to a block that is mined by the nodes 305 of the blockchain network 201, the block comprising the transaction may be validated by the blockchain network 201 and then recorded in the blockchain 132 as a smart contract 138. The agreement associated with the transaction may be given a unique blockchain address for identification.

At step 1304, the process 1300 waits to receive information regarding the conditions relevant for the agreement. For example, the process 1300 may wait to receive information recorded on the blockchain 132 that the batteries have arrived in the transport vehicle 122 at the vehicle installer 126. At step 1306, if such information is not received, then the process 1300 returns to step 1304. However, if at step 1306, the requisite information is received, then the process 1300 proceeds to step 1308 wherein the process determines whether the conditions of the agreement have been met as reflected in the received information. For example, at 1308 process may determine whether the SOH of the respective batteries satisfies the required SOH level for the batteries upon arrival at the vehicle installer 126.

At step 1310, based on determining that the received information satisfies the conditions needed to trigger execution of the various terms of the smart contract, the process 1300 proceeds to step 1310. However, at step 1308, if it is determined that the received information does not satisfy the conditions needed to trigger execution of the smart contract, then the process 1300 returns to step 1304. At step 1310, the process 1300 creates a transaction associated with execution of the smart contract. For example, the transaction may include information of the payment received, the date the payment was received, an identification of the parties involved, etc. The transaction may be broadcast to the blockchain network 201 and recorded in the blockchain 132. If the transaction is successfully recorded in the blockchain 132, the transaction may be executed.

With reference again to FIG. 9, the gap assessment component 918 can facilitate filling gaps in battery records record on the blockchain 132. In particular, in an optimal usage scenario, the blockchain records for a particular battery will provide a complete timeline of all contextual events that occur for the battery over the course of the tracked period (e.g., the transfer period or another timeframe) prior to installation of the battery into a vehicle, as well as information regarding the environmental conditions exposed to the battery and other sensor data and/or measures of the SOH of the vehicle battery. In various implementations however, there may be times segments over the tracked period where corresponding battery data 901 is not received due to various reasons. For example, the source of the data (e.g., the smart battery, the battery monitoring device, the external communication device 802, etc.) may not be communicatively connected to the network 130 to provide the data due to a technical communication issue. In another example, a source to provide the data may not be activated or available. For example, assume a scenario in which the transport vehicle 122 is transporting a plurality of conventional batteries (e.g., vehicle batteries 416) collectively being monitored by an external battery monitoring device 504 located within the transport vehicle 122 and the battery monitoring device 504 malfunctions and does not collect any corresponding sensor data. Various other reasons for missing battery data are envisioned.

In various embodiments, the gap assessment component 918 can monitor the information recorded on the blockchain 132 for respective batteries over time to identify time segments associated with one or more batteries with missing information. The gap assessment component 918 can employ various techniques to identify time segments corresponding to missing data, such as time segments where data should be received based on the context of the battery and the duration of the time segment exceeding a threshold. The gap assessment component 918 can further determine or infer (e.g., using AI component 920) the missing information based on the context of the battery preceding and/or following the gap timeframe, the time of the timeframe and information available from related sources associated with the battery and the gap timeframe. In this regard, the gap assessment component 918 can determine or infer one or more additional sources of battery data to fill the gap timeframe that are related to the battery context (e.g., time, location, environment, etc.). For instance, the gap assessment component 918 may identify other smart batteries included in the same transport vehicle that have provided battery data over the gap timeframe and fill the gap with their corresponding battery data. In another example, the gap assessment component 918 may identify a second transport vehicle travelling with the first transport vehicle associated with the missing data (e.g., in a fleet of several transport vehicles traveling together for instance) wherein the second vehicle provided corresponding battery data for second batteries being transported by the second vehicle over the gap timeframe. In this example, the gap assessment component 918 may utilize the battery data for the second batteries over the gap timeframe to fill the gap for the batteries in the first vehicle. Still in other embodiments, the gap assessment component 918 can utilize whether reports regarding whether at the time and location (e.g., trajectory) associated with the gap timeframe to determine or infer environmental conditions that may have been exposed to the battery over the gap timeframe.

Various aspects of the disclosed subject matter can employ machine learning (ML) and artificial intelligence (AI) to automatically generate inferences and predictions regarding tracked vehicle batteries described herein. To facilitate this end, the machine-executable components 902 can include AI component 920. In this regard, the AI component 920 can employ ML to facilitate various aspects the assessments performed by the assessment component 910. For example, the AI component 920 can employ ML and AI techniques to facilitate inferring one or more measures of the SOH of a vehicle battery based on the environmental conditions exposed, the charging/discharging events, the mechanical forces sustained, and other contextual events and conditions that were tracked for the vehicle battery. The AI component 920 can also employ ML and AI techniques to determine inferences regarding the gap assessment performed by the gap assessment component 918. For example, the AI component 920 can employ AI and ML to identify additional sources of battery data 901 to fill a gap timeframe associated with a particular battery over which sensor data and/or other contextual event data was not received. The AI component 920 can also facilitate identifying gap timeframes.

To facilitate this end, AI component 920 can perform learning with respect to any and all of the data received by the blockchain server device 900 and/or recorded on the blockchain 132 (e.g., the blockchain address 134, the blockchain records 136, the smart contracts 138, and the execution instructions 140). The AI component 920 can also evaluate relevant information provided by other systems/devices 222 (e.g., weather tracking systems, road/traffic monitoring systems, social medial systems, battery manufacturer systems, storage facility systems, vehicle manufacture systems, and so on). Hereinafter, any information received the blockchain server device 900, stored by the blockchain server device 900 and/or accessible to the blockchain server device 900 is collectively referred to as "collective machine learning data" for the AI component 920.

It should be appreciated that AI component 920 can perform learning associated with the collective machine learning data explicitly or implicitly. Learning and/or determining inferences by the AI component 920 can facilitate identification and/or classification of different patterns associated with the collective machine learning data, determining one or more rules associated with collective machine learning data, and/or determining one or more relationships associated with the collective machine learning data that influence determinations and inferences by the assessment component 910 and the gap assessment component 918. The AI component 920 can also employ an automatic classification system and/or an automatic classification process to facilitate identification and/or classification of different patterns associated with the collective machine learning data, determining one or more rules associated with collective machine learning data, and/or determining one or more relationships associated with the collective machine learning data that influence determinations and inferences by the assessment component 910 and the gap assessment component 918. For example, the AI component 920 can employ a probabilistic and/or statistical-based analysis (e.g., factoring into the analysis utilities and costs) to learn one or more patterns associated with the collective machine learning data, determining one or more rules associated with collective machine learning data, and/or determining one or more relationships associated with the collective machine learning data that influence determinations and inferences by the assessment component 910 and the gap assessment component 918. The AI component 920 can employ, for example, a support vector machine (SVM) classifier to facilitate learning patterns associated with the collective machine learning data, determining one or more rules associated with collective machine learning data, and/or determining one or more relationships associated with the collective machine learning data that influence determinations and inferences by the assessment component 910 and the gap assessment component 918. Additionally, or alternatively, the AI component 920 an employ other classification techniques associated with Bayesian networks, decision trees and/or probabilistic classification models. Classifiers employed by the AI component 920 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

In an aspect, the AI component 920 can utilize in part inference-based schemes to facilitate learning one or more patterns associated with the collective machine learning data, determining one or more rules associated with collective machine learning data, and/or determining one or more relationships associated with the collective machine learning data that influence determinations and inferences by the assessment component 910 and the gap assessment component 918. The AI component 920 can further employ any suitable machine-learning based techniques, statistical-based techniques and/or probabilistic-based techniques. The AI component 920 can additionally or alternatively employ a reduced set of factors (e.g., an optimized set of factors) to facilitate generating one or more models adapted one or more measures of the SOH of a vehicle battery based on various sensor data measurements and contextual events that may occur over the course of transfer of the vehicle battery. For example, the AI component 920 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the AI component 920 can perform a set of machine learning computations associated with collective machine learning data. For example, the AI component 920 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations. Any rules, patterns, and/or correlations learned by the AI component 920 with respect to the collective machine learning data can further be stored by the blockchain server device 900 in memory 926 and/or storage 922 and shared with other nodes of the blockchain network 201.

Figure 14:
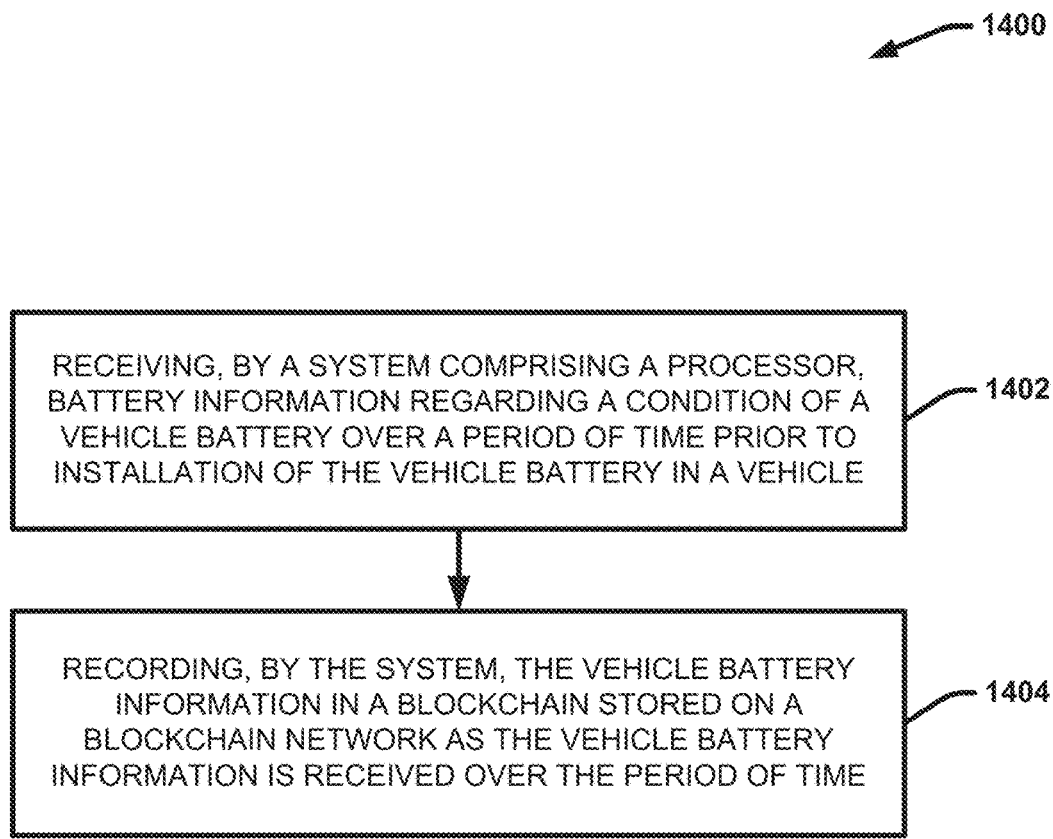
FIG. 14 presents a high-level flow diagram of an example computer implemented method for tracking information regarding the condition history of a vehicle battery using blockchain technology in accordance with various aspects and embodiments described herein.

FIG. 14 illustrates an example computer-implemented method 1400 for tracking and rewarding health and fitness activities of users using blockchain technology, in accordance with one or more embodiments described herein. Method 1400 comprises an example computer-implemented process that can be executed via one or more blockchain server devices of a blockchain network 201, such as blockchain server device 900. Repetitive description of like elements employed in respective embodiments is omitted for sake of brevity.

In accordance with method 1400, at 1402 a system comprising a processor (e.g., blockchain server device 900 or the like) receives battery information regarding a condition of a vehicle battery over a period of time prior to installation of the vehicle battery in a vehicle (e.g., via communication component 924). Method 1400 further comprises recording, by the system (e.g., via recording component 904), the vehicle battery information in a blockchain (e.g., blockchain 132 or the like) stored on a blockchain network (e.g., blockchain network 201) as the vehicle battery information is received over the period of time.

Figure 15:
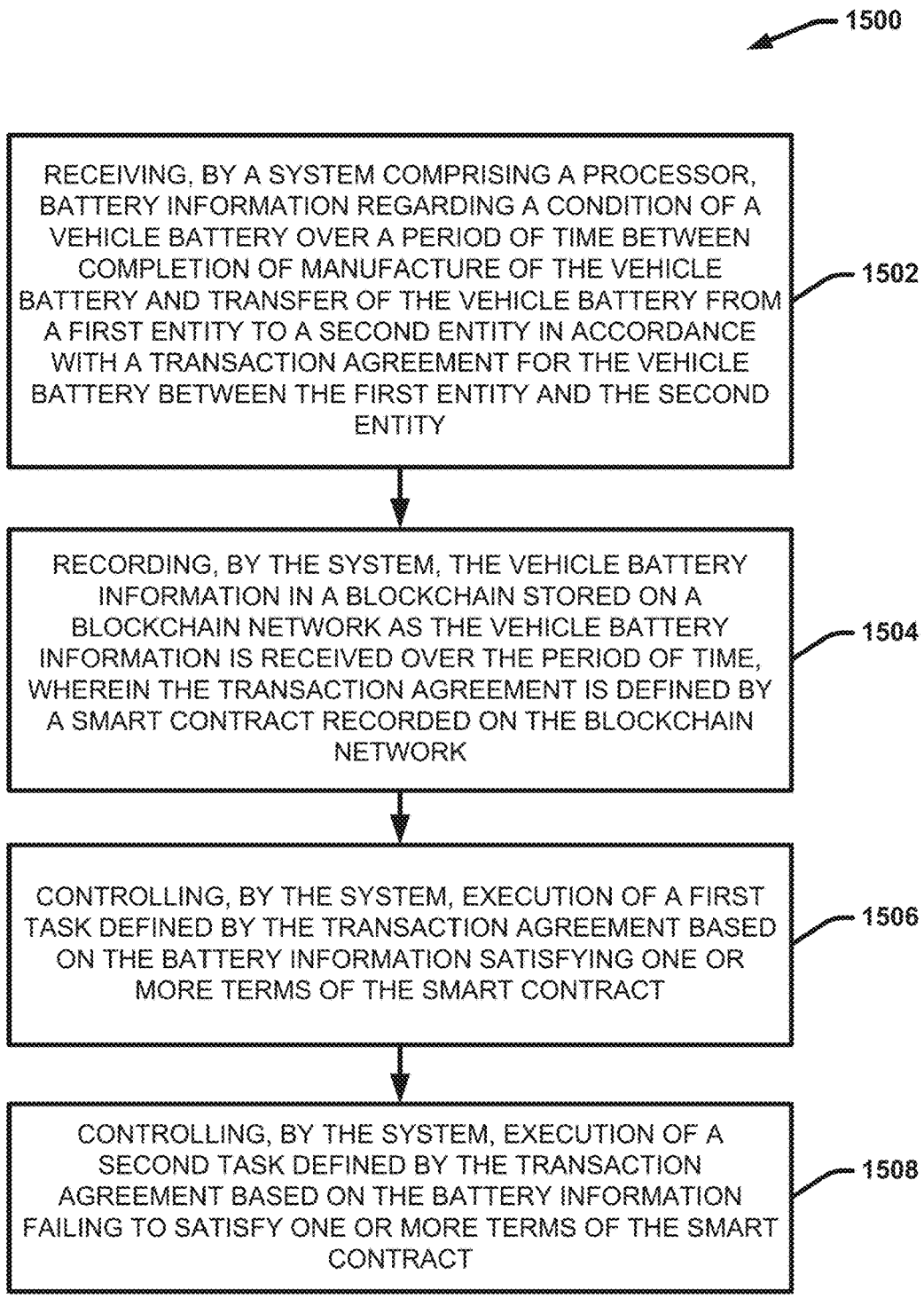
FIG. 15 presents a high-level flow diagram of an example computer implemented method for executing a smart contract controlling a transaction agreement for a vehicle battery in accordance with various aspects and embodiments described herein.

FIG. 15 presents a high-level flow diagram of an example computer implemented method 1500 for executing a smart contract controlling a transaction agreement for a vehicle battery in accordance with various aspects and embodiments described herein. Method 1500 comprises an example computer-implemented process that can be executed via one or more blockchain server devices of a blockchain network 201, such as blockchain server device 900. Repetitive description of like elements employed in respective embodiments is omitted for sake of brevity.

In accordance with method 1500, at 1402 a system comprising a processor (e.g., blockchain server device 900 or the like) receives battery information regarding a condition of a vehicle battery over a period of time between completion of manufacture of the vehicle battery and transfer of the vehicle battery from a first entity to a second entity in accordance with a transaction agreement for the vehicle battery between the first entity and the second entity. For example, the first entity may comprise the battery manufacturer 120 and the second entity may comprise the vehicle installer 126. At 1504, the system records (e.g., via recording component 904) the vehicle battery information in a blockchain (e.g., blockchain 132 or the like) stored on a blockchain network (e.g., blockchain network 201) as the vehicle battery information is received over the period of time, wherein the transaction agreement is defined by a smart contract recorded on the blockchain network.

At 1506, method 1500 further comprises controlling, by the system, execution of a first task defined by the transaction agreement based on the battery information satisfying one or more terms of the smart contract (e.g., via the task execution component 916). For example, the smart contract may define one or more first tasks to be performed automatically based on satisfaction of the terms of the smart contract, such as transferring a final payment from a financial account associated with the second entity to the first entity. The task execution component 916 can automatically execute such a task by accessing respective financial accounts for the first entity and the second entity and initiating or performing the transfer (e.g., of any digital currency). At 1508, method 1500 further comprises, controlling, by the system, execution of a second task defined by the transaction agreement based on the battery information failing to satisfy one or more terms of the smart contract (e.g., via the task execution component 916). For example, the second task may correspond to providing a partial refund based on the battery information indicating the battery has a deteriorated SOH level beyond a threshold level. In another example, the second task may correspond to automatically initiating a reordering and/or return process for the vehicle battery based on the battery information indicating the battery has a deteriorated SOH level beyond a threshold level. Various other tasks can conditions are envisioned.

Figure 16:
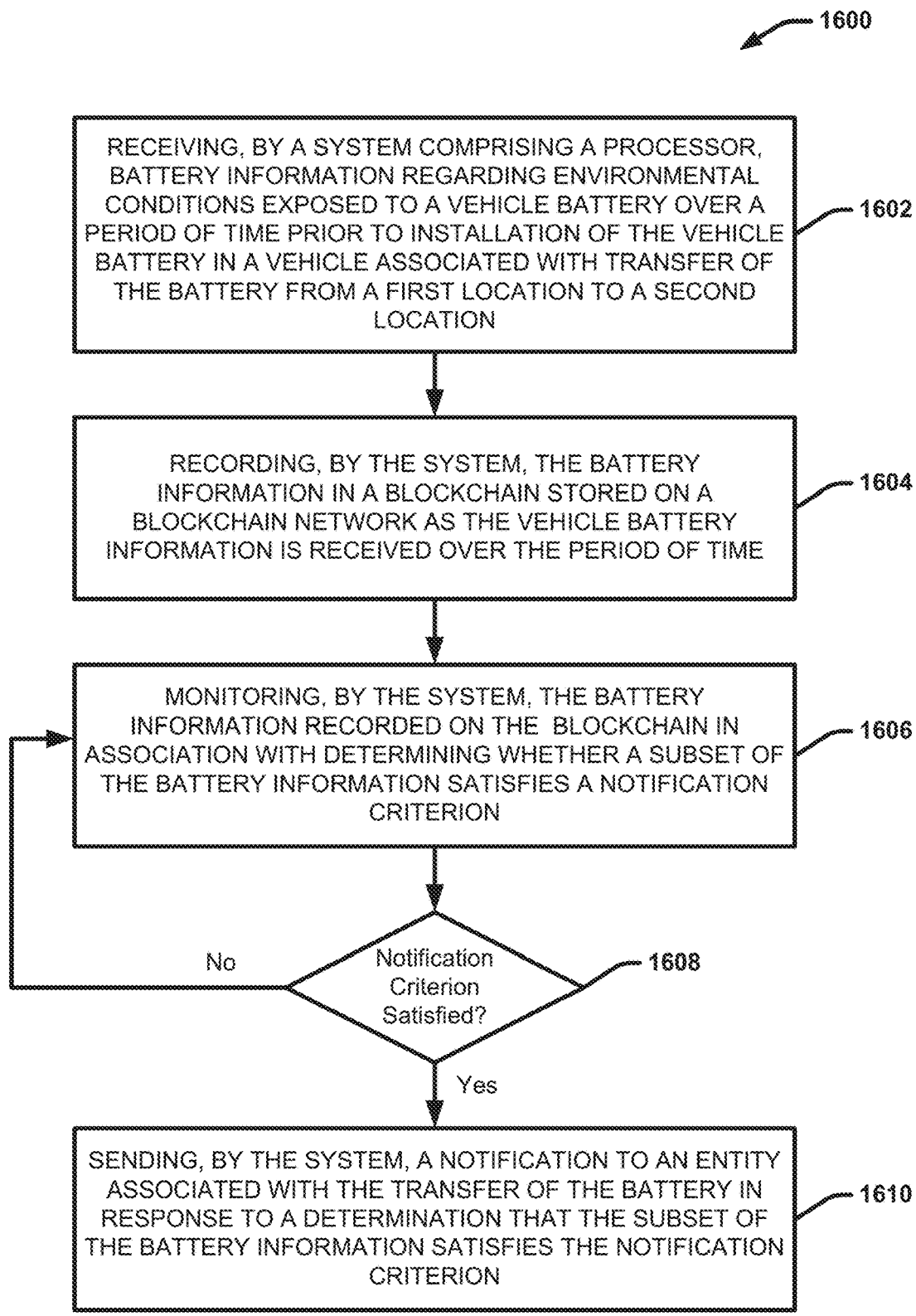
FIG. 16 presents a high-level flow diagram of an example computer implemented method for generating notifications regarding the condition of vehicle batteries prior to installation within a vehicle in accordance with various aspects and embodiments described herein.

FIG. 16 presents a high-level flow diagram of an example computer implemented method 1600 for generating notifications regarding the condition of vehicle batteries prior to installation within a vehicle in accordance with various aspects and embodiments described herein. Method 1600 comprises an example computer-implemented process that can be executed via one or more blockchain server devices of a blockchain network 201, such as blockchain server device 900. Repetitive description of like elements employed in respective embodiments is omitted for sake of brevity.

In accordance with method 1600, at 1602 a system comprising a processor (e.g., blockchain server device 900 or the like) receives battery information regarding environmental conditions exposed to a vehicle battery over a period of time prior to installation of the vehicle battery in a vehicle in association with transfer of the vehicle battery from a first location to a second location (e.g., via communication component 924). At 1604, method 1600 further comprises, recording, by the system, the battery information in a blockchain stored on a blockchain network as the vehicle battery information is received over the period of time (e.g., via recording component 904). At 1606, method 1600 further comprises, monitoring, by the system, the battery information recorded on the blockchain in association with determining whether a subset of the battery information satisfies a notification criterion (e.g., via notification component 912). For example, the notification criterion may relate to a value of a received sensor measurement (e.g., a temperature reading being above a threshold or above a threshold for a defined duration of time). In another example, the notification criterion may relate to a measure of damage or deterioration of the vehicle battery (e.g., a SOH measure being outside an acceptable range). Various other notification criterion are envisioned. At 1608, the system determines whether the notification criterion has been satisfied. Based on a determination that the notification criterion has not been satisfied, process 1600 can return to 1606. Based on a determination at 1608 that the notification criterion has been satisfied, method 1600 further comprises, at 1610, sending, by the system (e.g., via notification component 912) a notification to an entity associated with the transfer of the battery in response to a determination that the subset of the battery information satisfies the notification criterion. For example, the notification component 912 may send any suitable electronic notification (e.g., a text message, an email, etc.) to any define relevant entity for which the notification criterion is related, such as the entity responsible for minimizing damage or deterioration to the vehicle battery at the time at which the notification is generated or another entity involved in the vehicle battery supply chain distribution.

Figure 17:
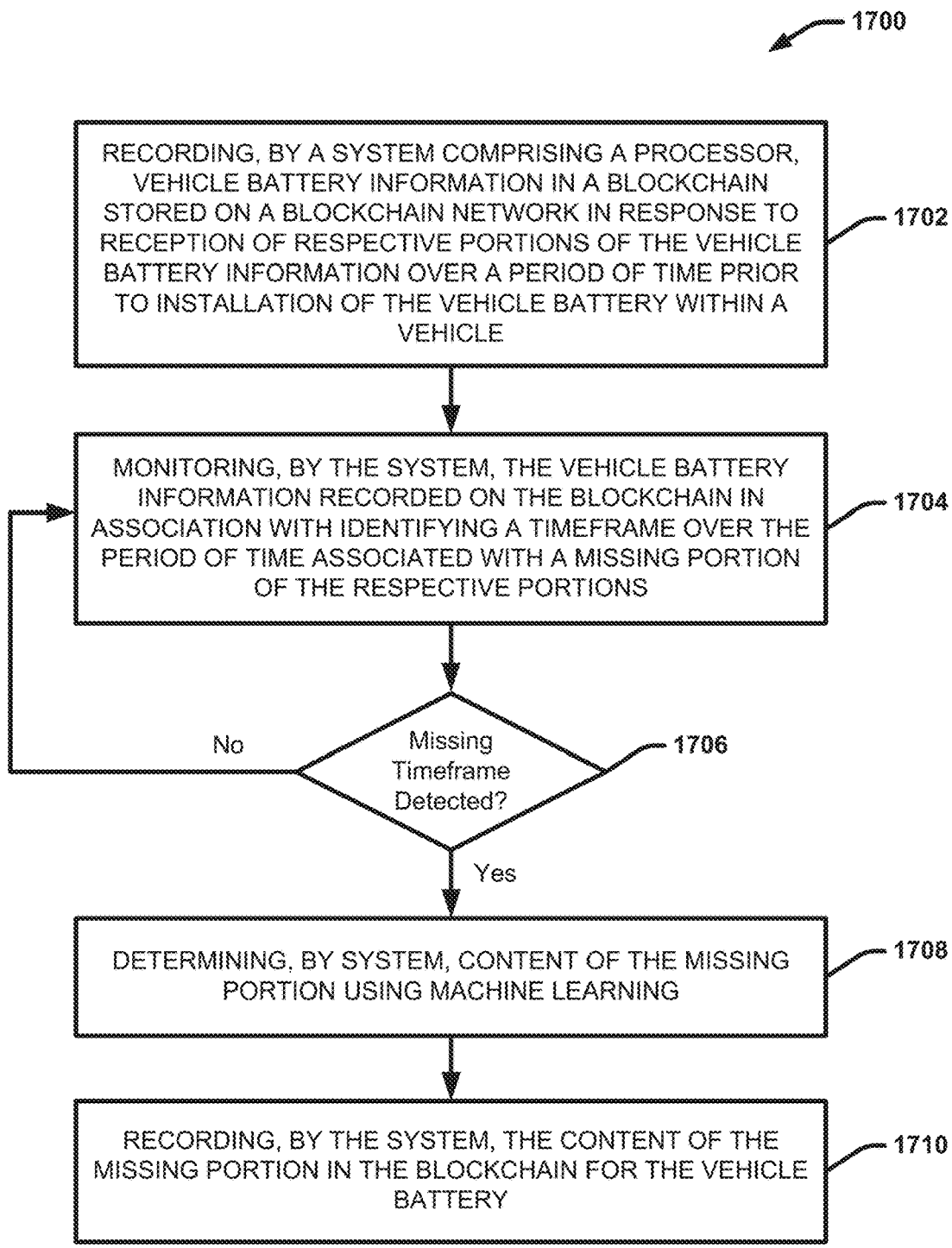
FIG. 17 presents a high-level flow diagram of an example computer implemented method for filling gaps in a blockchain record for a vehicle battery in accordance with various aspects and embodiments described herein.

FIG. 17 presents a high-level flow diagram of an example computer implemented method 1700 for filling gaps in a blockchain record for a vehicle battery in accordance with various aspects and embodiments described herein. Method 1700 comprises an example computer-implemented process that can be executed via one or more blockchain server devices of a blockchain network 201, such as blockchain server device 900. Repetitive description of like elements employed in respective embodiments is omitted for sake of brevity.

In accordance with method 1700, at 1702 a system comprising a processor (e.g., blockchain server device 900 or the like) record vehicle battery information in a blockchain stored on a blockchain network in response to reception of respective portions of the vehicle battery information over a period of time prior to installation of the vehicle battery within a vehicle (e.g., via recording component 904). At 1704, the system monitors the vehicle battery information recorded on the blockchain in association with identifying a timeframe over the period of time associated with a missing portion of the respective portions (e.g., via gap assessment component 1918). At 1706, the system determines whether a missing timeframe is detected. For example, the gap assessment component 918 may determine whether a missing timeframe is detected based on failure to receive any information for the vehicle battery after a defined threshold timeframe following reception of the last portion of information for the vehicle battery. In another example, the gap assessment component 918 may determine whether missing a missing timeframe is detected based on the time difference between the past two consecutive battery data reporting exceeding a threshold duration.

If at 1706, the gap assessment component 918 determines that a missing timeframe is not detected, then process 1700 can continue with the monitoring at 1704. However, based on a determination that a missing timeframe exists, then at 1708, process 1700 further comprises determining, by system, content of the missing portion using machine learning (e.g., via AI component 920). For example, in various embodiments, the vehicle battery information can be received from a first source (e.g., the vehicle battery itself as a smart battery, a battery monitoring device associated with the vehicle battery, smart charging unit, etc.). The AI component 920 and/or the gap assessment component 918 can determine the content of the missing portion based on additional vehicle battery information received form a second source recorded on the blockchain. The AI component 920 and/or the gap assessment component 918 can identify the second source based on a context of the vehicle battery relative to the timeframe, such as the location or environment of the vehicle battery at the timeframe. The AI component 920 may infer the context of the vehicle battery at the timeframe based on information recorded on the blockchain indicating the location/environment of the battery preceding the missing timeframe, the travel trajectory of the vehicle battery and other factors. The second source can include another vehicle battery, vehicle monitoring device, or the like associated with the same context. For example, the other vehicle battery or monitoring device may include another battery in the same transport vehicle (or a different transport vehicle located within a defined distance relative to the transport vehicle transporting the battery associated with the missing data) and/or storage facility. At 1710, process 1700 further comprises recording, by the system, the content of the missing portion in the blockchain for the vehicle battery (e.g., via recording component 904).

Figure 18:
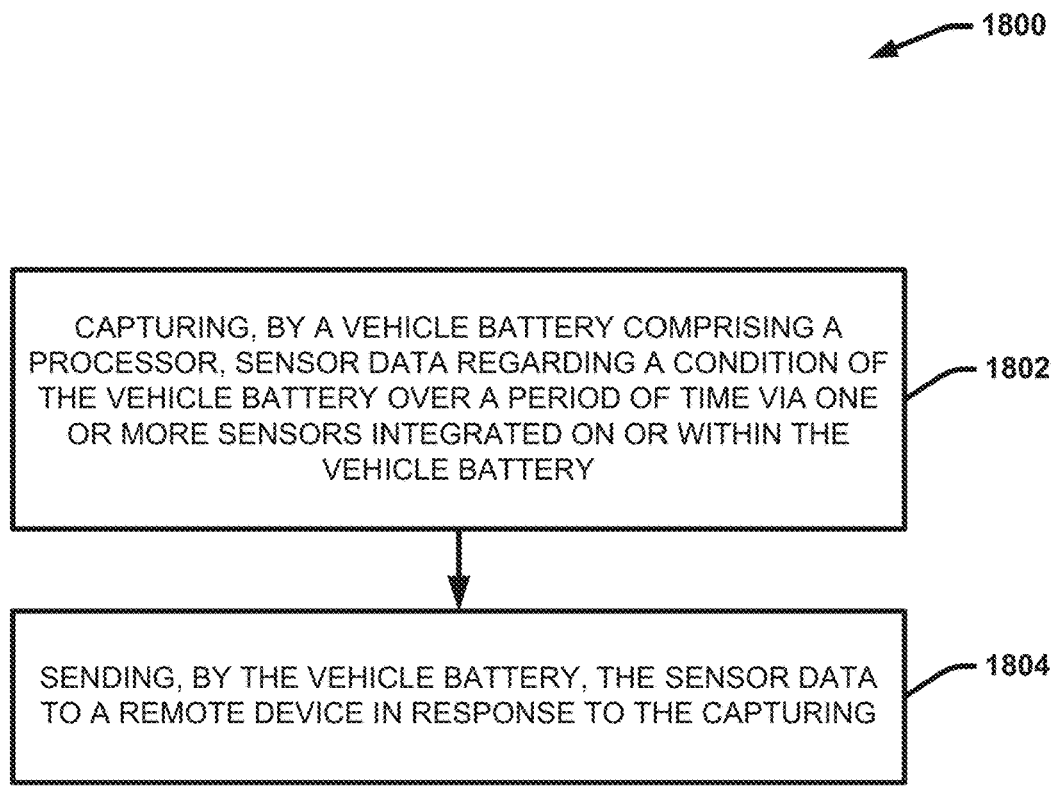
FIG. 18 presents a high-level flow diagram of an example computer implemented method for tracking information regarding the condition history of a vehicle battery using blockchain technology in accordance with various aspects and embodiments described herein.

FIG. 18 presents a high-level flow diagram of an example computer implemented method 1800 for tracking information regarding the condition history of a vehicle battery using blockchain technology in accordance with various aspects and embodiments described herein. Method 1800 comprises an example computer-implemented process that can be executed by a smart battery (e.g., smart battery 400, smart battery 500 or the like). Repetitive description of like elements employed in respective embodiments is omitted for sake of brevity.

In accordance with method 1800, at 1802 a vehicle battery comprising a processor (e.g. smart battery 400, smart battery 500 or the like) captures sensor data regarding a condition of the vehicle battery over a period of time via one or more sensors integrated on or within the vehicle battery (e.g., via sensing component 408 and one or more sensors 426). At 8104, the vehicle battery sends the sensor data to a remote device in response to the capturing (e.g., via communication component 417). In various embodiments, the remote device comprises one or more nodes (e.g., nodes 305) of a blockchain network 201.

Example Operating Environments

Figure 19:
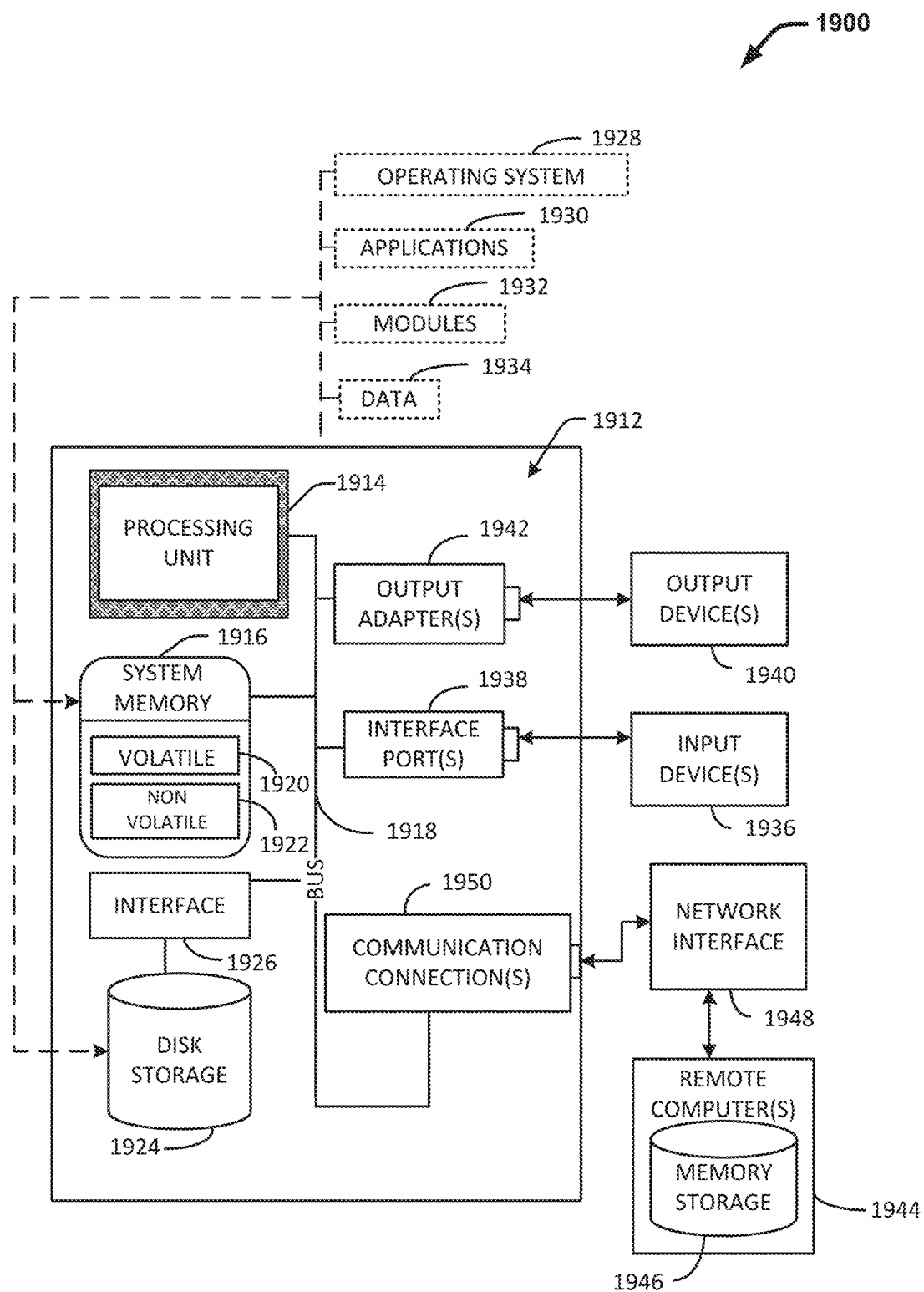
FIG. 19 depicts an example schematic block diagram of a computing environment with which the disclosed subject matter can interact/be implemented at least in part, in accordance with various aspects and implementations of the subject disclosure.
Figure 20:
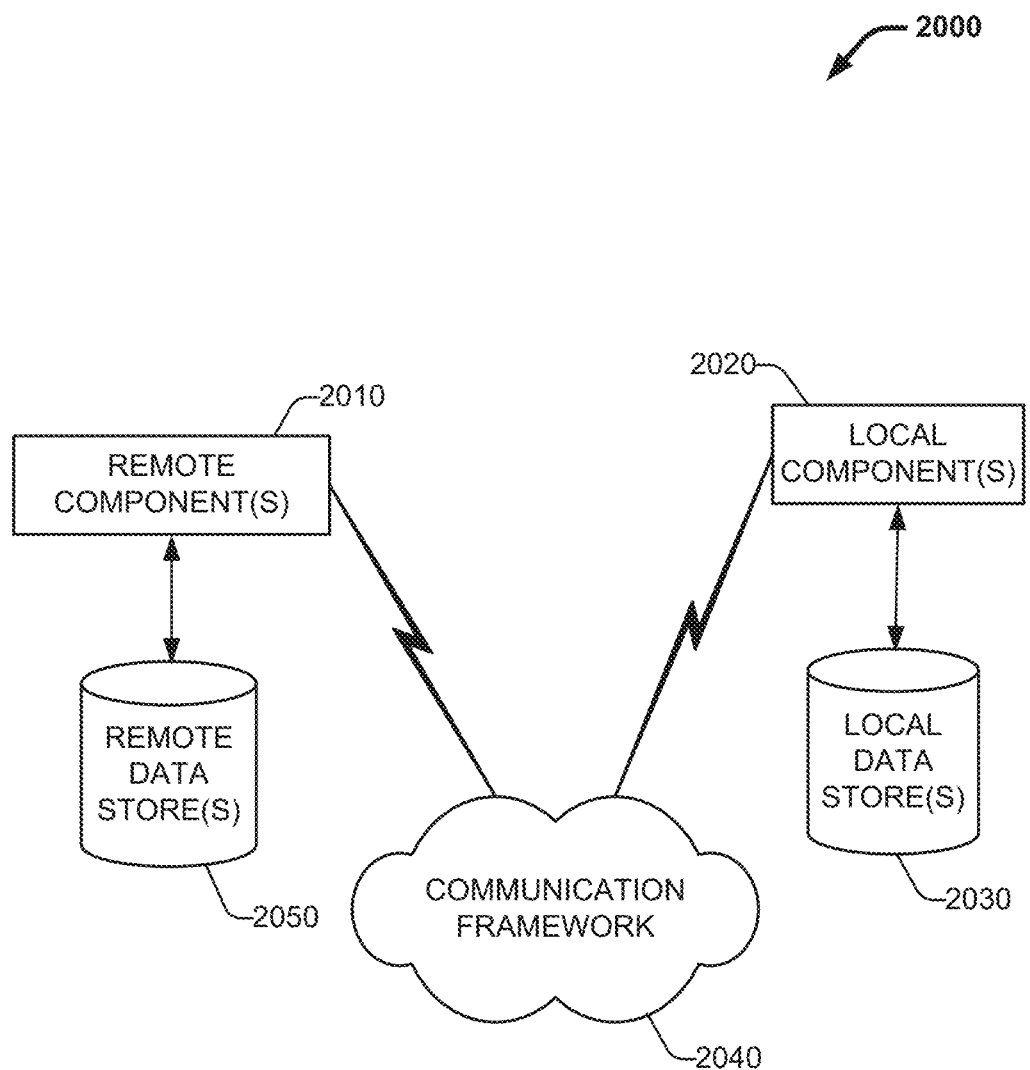
FIG. 20 is a block diagram representing an example computing environment into which aspects of the subject matter described herein may be incorporated.

Turning next to FIGS. 19 and 20, a detailed description is provided of additional context for the one or more embodiments described herein with FIGS. 1-18.

In order to provide a context for the various aspects of the disclosed subject matter, FIG. 19 as well as the following discussion are intended to provide a general description of a suitable environment in which the various aspects of the disclosed subject matter can be implemented. FIG. 19 illustrates a block diagram of an example, non-limiting operating environment in which one or more embodiments described herein can be facilitated. Repetitive description of like elements employed in other embodiments described herein is omitted for sake of brevity. With reference to FIG. 19, a suitable operating environment 1900 for implementing various aspects of this disclosure can also include a computer 1912. The computer 1912 can also include a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914. The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), Small Computer Systems Interface (SCSI), a controller area network (CAN) bus, and a local interconnect network (LIN) bus. The system memory 1916 can also include volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1912 can also include removable/non-removable, volatile/non-volatile computer storage media. FIG. 19 illustrates, for example, a disk storage 1924. Disk storage 1924 can also include, but is not limited to, devices like a magnetic disk drive, floppy disk drive, tape drive, Jaz drive, Zip drive, LS-100 drive, flash memory card, or memory stick. The disk storage 1924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used, such as interface 1926. FIG. 19 also depicts software that acts as an intermediary between users and the basic computer resources described in the suitable operating environment 1900. Such software can also include, for example, an operating system 1928. Operating system 1928, which can be stored on disk storage 1924, acts to control and allocate resources of the computer 1912. System applications 1930 take advantage of the management of resources by operating system 1928 through program modules 1932 and program data 1934, e.g., stored either in system memory 1916 or on disk storage 1924. It is to be appreciated that this disclosure can be implemented with various operating systems or combinations of operating systems. A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port can be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a computer, a server, a router, a network PC, a workstation, a microprocessor based appliance, a peer device or other common network node and the like, and typically can also include many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1950 refers to the hardware/software employed to connect the network interface 1648 to the system bus 1918. While communication connection 1950 is shown for illustrative clarity inside computer 1912, it can also be external to computer 1912. The hardware/software for connection to the network interface 1948 can also include, for example purposes only, internal and external technologies such as, modems including regular telephone grade modems, cable modems and DSL modems, ISDN adapters, and Ethernet cards.

The illustrated embodiments described herein can be employed relative to distributed computing environments (e.g., cloud computing environments), such as described below with respect to FIG. 20, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment described below with reference to illustration 2000 of FIG. 20. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems described herein can be associated with and/or be included in cloud-based and/or partially-cloud-based system.

Referring now to details of one or more elements illustrated at FIG. 20, an illustrative cloud computing environment 2000 is depicted. FIG. 20 is a schematic block diagram of a computing environment 2000 with which the disclosed subject matter can interact. The system 2000 comprises one or more remote component(s) 2010. The remote component(s) 2010 can be hardware and/or software (e.g., threads, processes, computing devices). In some embodiments, remote component(s) 2010 can be a distributed computer system, connected to a local automatic scaling component and/or programs that use the resources of a distributed computer system, via communication framework 2040. Communication framework 2040 can comprise wired network devices, wireless network devices, mobile devices, wearable devices, radio access network devices, gateway devices, femtocell devices, servers, etc.

The system 2000 also comprises one or more local component(s) 2020. The local component(s) 2020 can be hardware and/or software (e.g., threads, processes, computing devices). In some embodiments, local component(s) 2020 can comprise an automatic scaling component and/or programs that communicate/use the remote resources 2010 and 2020, etc., connected to a remotely located distributed computing system via communication framework 2040.

One possible communication between a remote component(s) 2010 and a local component(s) 2020 can be in the form of a data packet adapted to be transmitted between two or more computer processes. Another possible communication between a remote component(s) 2010 and a local component(s) 2020 can be in the form of circuit-switched data adapted to be transmitted between two or more computer processes in radio time slots. The system 2000 comprises a communication framework 2040 that can be employed to facilitate communications between the remote component(s) 2010 and the local component(s) 2020, and can comprise an air interface, e.g., Uu interface of a UMTS network, via a long-term evolution (LTE) network, etc. Remote component(s) 2010 can be operably connected to one or more remote data store(s) 2050, such as a hard drive, solid state drive, SIM card, device memory, etc., that can be employed to store information on the remote component(s) 2010 side of communication framework 2040. Similarly, local component(s) 2020 can be operably connected to one or more local data store(s) 2030, that can be employed to store information on the local component(s) 2020 side of communication framework 2040.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes", "has", "possesses", and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

Further aspects of the invention are provided by the subject matter of the following clauses:

1. A system, comprising:
    a memory that stores computer executable components; and
    a processor that executes the computer executable components stored in the memory, wherein the computer executable components comprise:
        a communication component that receives battery information regarding a condition of a vehicle battery over a period of time prior to installation of the vehicle battery in a vehicle; and
        a recording component that records the vehicle battery information in a blockchain stored on a blockchain network as the vehicle battery information is received over the period of time.

2. The system of any one or more preceding clause(s), wherein the battery information comprises sensor data captured via one or more sensors associated with the vehicle battery, and wherein the reception component receives the sensor data in response to capture of the sensor data by the one or more sensors.

3. The system of any one or more preceding clause(s), wherein the one or more sensors comprise a sensor integrated on or within the vehicle battery selected from the group consisting of: an environmental sensor, a motion sensor and a pressure sensor.

4. The system of any one or more preceding clause(s), wherein the one or more sensors comprise a sensor located on or within a transport vehicle used to transport the vehicle battery over the period of time or a storage environment used to store the vehicle battery over the period of time, the sensor selected from the group consisting of an environmental sensor, a motion sensor and a pressure sensor.

5. The system of any one or more preceding clause(s), wherein the sensor data comprises environment data regarding environmental conditions exposed to the vehicle battery over the period of time, timing of exposure and location of exposure.

6. The system of any one or more preceding clause(s), wherein the condition reflects a quality of the vehicle battery, and wherein the computer executable components further comprise:
    an assessment component that determines one or measures of the quality of the vehicle battery based on the environment data, and wherein the recording component records the one or more measures of quality of the vehicle battery in the blockchain.

7. The system of any one or more preceding clause(s), wherein the one or more measures of quality comprise a measure of damage or deterioration to the vehicle battery attributed to the environmental conditions.

8. The system of any one or more preceding clause(s), wherein the assessment component determines timing of the damage or degradation to the vehicle battery and wherein the recording component records the timing of the damage or degradation to the vehicle battery in the blockchain.

9. The system of any one or more preceding clause(s), wherein the period of time comprises a duration of time between completion of manufacture of the vehicle battery and transfer of the vehicle battery from a first entity to a second entity in accordance with a transaction agreement for the vehicle battery between the first entity and the second entity.

10. The system of any one or more preceding clause(s), wherein period of time comprises a transport period time over which the vehicle battery is transported from a first location associated with the first entity to a second location associated with the second entity.

11. The system of any one or more preceding clause(s), wherein the transaction agreement is defined by a smart contract recorded on the blockchain network, and wherein the computer executable components further comprise:
  a task execution component that controls execution of a first task defined by the transaction agreement based on the battery information or the one or more measures of the quality of the vehicle battery satisfying one or more terms of the smart contract.

12. The system of any preceding clause, wherein the task execution component controls execution of a second task defined by the transaction agreement based on the battery information or the one or more measures of the quality of the vehicle battery failing to satisfy one or more terms of the smart contract.

13. The system of clause 1 above with any set of combinations of the systems 2-12 above.

14. A method, comprising:
  receiving, by a system comprising a processor, battery information regarding a condition of a vehicle battery over a period of time prior to installation of the vehicle battery in a vehicle; and
  recording, by the system, the vehicle battery information in a blockchain stored on a blockchain network as the vehicle battery information is received over the period of time.

15. The method of any one or more preceding clause(s), wherein the battery information comprises sensor data captured via one or more sensors associated with the vehicle battery, and wherein the receiving is responsive to capture of the sensor data by the one or more sensors.

16. The method of any one or more preceding clause(s), wherein the sensor data comprises environment data regarding environmental conditions exposed to the vehicle battery over the period of time, timing of exposure and location of exposure.

17. The method of any one or more preceding clause(s), wherein the condition reflects a quality of the vehicle battery, and wherein the method further comprises:
  determining, by the system, one or measures of the quality of the vehicle battery based on the environment data; and
  recording, by the system, the one or more measure of quality of the vehicle battery in the blockchain.

18. The method of any one or more preceding clause(s), wherein the one or more measures of quality comprise a measure of damage or deterioration to the vehicle battery attributed to the environmental conditions.

19. The method of any one or more preceding clause(s), wherein the period of time comprises a duration of time between completion of manufacture of the vehicle battery and transfer of the vehicle battery from a first entity to a second entity in accordance with a transaction agreement for the vehicle battery between the first entity and the second entity, wherein the transaction agreement is defined by a smart contract recorded on the blockchain network, and wherein the method further comprises:
  controlling, by the system, execution of a first task defined by the transaction agreement based on the battery information or the one or more measures of the quality of the vehicle battery satisfying one or more terms of the smart contract; and
  controlling, by the system, execution of a second task defined by the transaction agreement based on the battery information or the one or more measures of the quality of the vehicle battery failing to satisfy one or more terms of the smart contract.

20. The method of clause 14 above with any set of combinations of the methods 14-19 above.

21. A non-transitory machine-readable storage medium, comprising executable instructions that, when executed by a processor, facilitate performance of operations, comprising:
  receiving environmental data regarding environmental conditions exposed to a vehicle battery over a period of time prior to installation of the vehicle battery in a vehicle, wherein at least some of the environmental data comprises sensor data captured via one or more sensors associated with the vehicle battery; and
  recording, by the system, the environmental data in a blockchain stored on a blockchain network as the vehicle battery information is received over the period of time.

22. The non-transitory machine-readable storage medium of clause 21, wherein the operations further comprise:
  determining one or measures of the quality of the vehicle battery based on the environment data; and
  recording the one or more measure of quality of the vehicle battery in the blockchain network.

What is claimed is:

1. A system, comprising:
  a memory that stores computer executable components; and
  a processor that executes at least one of the computer executable components that:
    receives an electronic signal indicating that manufacturing of a smart vehicle battery is completed, wherein the smart vehicle battery comprises:
      a group of battery cells,
      one or more integrated sensors configured to capture sensor data associated with at least operating parameter of the smart vehicle battery, and
      a communication device configured to transmit the sensor data;
    in response to receiving the electronic signal indicating that manufacturing of the smart vehicle battery is completed, remotely activates the one or more integrated sensors of the smart vehicle battery prior to transferring the smart vehicle battery away from a location of the manufacturing;
    receives, via the communications device of the smart vehicle battery, the sensor data of the smart vehicle battery over a period of time prior to installation of the smart vehicle battery in a vehicle; and that records vehicle battery information comprising the sensor data of the smart vehicle battery in a blockchain stored on a blockchain network as the sensor data is received over the period of time.

2. The system of claim 1, wherein the one or more integrated sensors comprise at least one of an environmental sensor, a motion sensor, or a pressure sensor.

3. The system of claim 2, wherein the sensor data comprises environment data regarding environmental conditions exposed to the smart vehicle battery over the period of time, respective timings of the exposure to the environmental conditions, and respective locations of the exposure to the environmental conditions.

4. The system of claim 3, wherein the at least one of the computer executable components further:

determines one or measures of quality of the smart vehicle battery based on the environment data, and records the one or more measures of quality of the smart vehicle battery in the blockchain.

5. The system of claim 4, wherein the one or more measures of quality comprise a measure of damage or deterioration to the smart vehicle battery attributed to the environmental conditions.

6. The system of claim 5, wherein the at least one of the computer executable components further:

determines timing of the damage or degradation to the smart vehicle battery, and records the timing of the damage or degradation to the smart vehicle battery in the blockchain.

7. The system of claim 4, wherein the period of time comprises a duration of time between completion of manufacture of the smart vehicle battery and transfer of the smart vehicle battery from a first entity to a second entity in accordance with a transaction agreement for the smart vehicle battery between the first entity and the second entity.

8. The system of claim 7, wherein the period of time comprises a transport period time over which the smart vehicle battery is transported from the location of the manufacturing to a location associated with the second entity.

9. The system of claim 7, wherein the transaction agreement is defined by a smart contract recorded on the blockchain network, and wherein the at least one of computer executable components further:

controls execution of a first task defined by the transaction agreement based on at least one of the vehicle battery information or the one or more measures of the quality of the smart vehicle battery satisfying one or more terms of the smart contract.

10. The system of claim 9, wherein the at least one of the computer executable components further:

controls execution of a second task defined by the transaction agreement based on at least one of the vehicle battery information or the one or more measures of the quality of the smart vehicle battery failing to satisfy one or more terms of the smart contract.

11. A method, comprising:

receiving, by a system comprising a processor, an electronic signal indicating that manufacturing of a smart vehicle battery is completed, wherein the smart vehicle battery comprises:
a group of battery cells,
one or more integrated sensors configured to capture sensor data associated with at least operating parameter of the smart vehicle battery, and
a communication device configured to transmit the sensor data;

in response to receiving the electronic signal indicating that manufacturing of the smart vehicle battery is completed, remotely activates the one or more integrated sensors of the smart vehicle battery prior to transferring the smart vehicle battery away from a location of the manufacturing;

receiving, by the system, via the communications device of the smart vehicle battery, the sensor data of the smart vehicle battery over a period of time prior to installation of the smart vehicle battery in a vehicle; and recording, by the system, vehicle battery information comprising the sensor data of the smart vehicle battery in a blockchain stored on a blockchain network as the sensor data is received over the period of time.

12. The method of claim 11, wherein the one or more integrated sensors comprise at least one of an environmental sensor, a motion sensor, or a pressure sensor.

13. The method of claim 12, wherein the sensor data comprises environment data regarding environmental conditions exposed to the smart vehicle battery over the period of time, respective timings of the exposure to the environmental conditions, and respective locations of the exposure to the environmental conditions.

14. The method of claim 13, wherein the method further comprises:

determining, by the system, one or measures of quality of the smart vehicle battery based on the environment data; and recording, by the system, the one or more measure of quality of the smart vehicle battery in the blockchain.

15. The method of claim 14, wherein the one or more measures of quality comprise a measure of damage or deterioration to the smart vehicle battery attributed to the environmental conditions.

16. The method of claim 14, wherein the period of time comprises a duration of time between completion of manufacture of the smart vehicle battery and transfer of the smart vehicle battery from a first entity to a second entity in accordance with a transaction agreement for the smart vehicle battery between the first entity and the second entity, wherein the transaction agreement is defined by a smart contract recorded on the blockchain network, and wherein the method further comprises:

controlling, by the system, execution of a first task defined by the transaction agreement based on at least one of the vehicle battery information or the one or more measures of the quality of the smart vehicle battery satisfying one or more terms of the smart contract; and controlling, by the system, execution of a second task defined by the transaction agreement based on at least one of the vehicle battery information or the one or more measures of the quality of the smart vehicle battery failing to satisfy one or more terms of the smart contract.

17. A non-transitory machine-readable storage medium, comprising executable instructions that, when executed by a processor, facilitate performance of operations, comprising:

receiving an electronic signal indicating that manufacturing of a smart vehicle battery is completed, wherein the smart vehicle battery comprises:
a group of battery cells,
one or more integrated sensors configured to capture sensor data associated with at least operating parameter of the smart vehicle battery, and a communication device configured to transmit the sensor data;

in response to receiving the electronic signal indicating that manufacturing of the smart vehicle battery is completed, remotely activates the one or more integrated sensors of the smart vehicle battery prior to transferring the smart vehicle battery away from a location of the manufacturing;

receiving, via the communications device of the smart vehicle battery, the sensor data of the smart vehicle battery over a period of time prior to installation of the smart vehicle battery in a vehicle; and recording vehicle battery information comprising the sensor data of the smart vehicle battery in a blockchain stored on a blockchain network as the sensor data is received over the period of time.

18. The non-transitory machine-readable storage medium of claim 17, wherein the one or more integrated sensors comprise at least one of an environmental sensor, a motion sensor, or a pressure sensor.

19. The non-transitory machine-readable storage medium of claim 18, wherein the sensor data comprises environment data regarding environmental conditions exposed to the smart vehicle battery over the period of time, respective timings of the exposure to the environmental conditions, and respective locations of the exposure to the environmental conditions.

20. The non-transitory machine-readable storage medium of claim 19, wherein the operations further comprise:
determining one or measures of quality of the smart vehicle battery based on the environment data; and
recording the one or more measure of quality of the smart vehicle battery in the blockchain.

\* \* \* \* \*